US010039107B2

(12) United States Patent
Faerber et al.

(10) Patent No.: US 10,039,107 B2
(45) Date of Patent: Jul. 31, 2018

(54) APPARATUS, SYSTEM AND METHOD OF DYNAMIC ALLOCATION OF RADIO RESOURCES TO WIRELESS COMMUNICATION LINKS OF A PLURALITY OF TYPES

(71) Applicant: INTEL IP CORPORATION, Santa Clara, CA (US)

(72) Inventors: Michael Faerber, Wolfratshausen (DE); Andreas Schmidt, Braunschweig (DE); Martin Hans, Bad Salzdetfurth (DE); Maik Bienas, Braunschweig (DE)

(73) Assignee: INTEL IP CORPORATION, Santa Clara, CA (US)

( * ) Notice: Subject to any disclaimer, the term of this patent is extended or adjusted under 35 U.S.C. 154(b) by 114 days.

(21) Appl. No.: 15/026,610

(22) PCT Filed: Dec. 19, 2013

(86) PCT No.: PCT/US2013/076379
§ 371 (c)(1),
(2) Date: Apr. 1, 2016

(87) PCT Pub. No.: WO2015/094256
PCT Pub. Date: Jun. 25, 2015

(65) Prior Publication Data
US 2016/0255613 A1    Sep. 1, 2016

(51) Int. Cl.
*H04W 4/00* (2018.01)
*H04W 72/04* (2009.01)
(Continued)

(52) U.S. Cl.
CPC ......... *H04W 72/046* (2013.01); *H04W 16/10* (2013.01); *H04W 16/32* (2013.01);
(Continued)

(58) Field of Classification Search
CPC ............. H04W 72/046; H04W 72/044; H04W 72/0486; H04W 72/082; H04W 72/085;
(Continued)

(56) References Cited

U.S. PATENT DOCUMENTS 9,414,395 B2 * 8/2016 Kwon .................. H04W 72/082
2009/0163222 A1 6/2009 Schaepperle et al.
(Continued)

FOREIGN PATENT DOCUMENTS

WO    2013/050084    4/2013
WO    2013/086410    6/2013

OTHER PUBLICATIONS

European Search Report for European Patent Application No. 13899946.1, dated Jul. 17, 2017, 14 pages.
(Continued)

*Primary Examiner* — Kevin Mew
(74) *Attorney, Agent, or Firm* — Shichrur & Co.

(57) ABSTRACT

Some demonstrative embodiments include apparatuses, systems and/or methods of dynamic allocation of radio resources. For example, a resource allocator may dynamically allocate to a plurality of nodes of a cellular network non-cellular radio resources for communication over a plurality of non-cellular wireless communication links, the resource allocator may be configured to assign the non-cellular radio resources to a plurality of resource blocks corresponding to a plurality of link types, and to dynamically allocate to a non-cellular wireless communication link resources from a resource block corresponding to a link type of the non-cellular wireless communication link.

24 Claims, 7 Drawing Sheets

(51) Int. Cl.
*H04W 16/10* (2009.01)
*H04W 16/32* (2009.01)
*H04W 72/08* (2009.01)
*H04W 72/12* (2009.01)
*H04W 72/10* (2009.01)
*H04W 84/12* (2009.01)
*H04W 16/14* (2009.01)
*H04W 88/06* (2009.01)

(52) U.S. Cl.
CPC ..... *H04W 72/044* (2013.01); *H04W 72/0486* (2013.01); *H04W 72/082* (2013.01); *H04W 72/1215* (2013.01); *H04W 16/14* (2013.01); *H04W 72/085* (2013.01); *H04W 72/10* (2013.01); *H04W 84/12* (2013.01); *H04W 88/06* (2013.01)

(58) Field of Classification Search
CPC . H04W 72/10; H04W 72/1215; H04W 16/10; H04W 16/32; H04W 16/14; H04W 84/12; H04W 88/06
See application file for complete search history.

(56) References Cited

U.S. PATENT DOCUMENTS

| | | | |
|---|---|---|---|
| 2009/0180430 A1 | 7/2009 | Fadell | |
| 2009/0323604 A1 | 12/2009 | Jaeger et al. | |
| 2010/0322141 A1* | 12/2010 | Liu | H04W 24/10 370/315 |
| 2011/0182174 A1 | 7/2011 | Pi et al. | |
| 2011/0235601 A1* | 9/2011 | Yoo | H04L 5/0053 370/329 |
| 2011/0310789 A1* | 12/2011 | Hu | H04L 5/0005 370/315 |
| 2012/0114021 A1* | 5/2012 | Chung | H04B 7/155 375/211 |
| 2012/0281614 A1* | 11/2012 | Deng | H04W 88/04 370/315 |
| 2013/0012217 A1* | 1/2013 | Suda | H04W 72/0446 455/450 |
| 2013/0034043 A1* | 2/2013 | Yu | H04W 72/085 370/315 |
| 2013/0322293 A1* | 12/2013 | Kang | H04W 48/16 370/254 |
| 2014/0098912 A1* | 4/2014 | Yin | H04B 7/0417 375/345 |
| 2015/0017992 A1* | 1/2015 | Kwon | H04W 72/082 455/437 |
| 2016/0105893 A1* | 4/2016 | Senarath | H04W 4/021 370/329 |

OTHER PUBLICATIONS

Rappaport T S et al: "Millimeter Wave Mobile Communications for 5G Cellular: It Will Work!", IEEE Access, IEEE, Piscataway, NJ, USA, vol. 1, May 10, 2013, 15 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wigig Wireless Gigabit Alliance, Wigig MAC and PHY Specification Version 1.1, Apr. 2011, 442 pages.
ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), 217 pages.
International Search Report and Written Opinion for PCT/US2013/076379, dated Sep. 18, 2014, 9 pages.
Intel Corporation 'On Resource Allocation for D2D Discovery', R1-135119, 3GPP TSG RAN WG1 Meeting #75, San Francisco, Nov. 11-15, 2013 (http://www.3gpp.org/ftp/tsg_ran/WG1_RL1/TSGR1_75/Docs/R1-135119.zip) See pp. 1-6. 6 pages.
Intel Corporation 'Discussion on D2D Resource Allocation Method'. R1-135115, 3GPP TSG RAN WG1 Meeting #75, San Francisco, Nov. 11-15, 2013 (http://www.3gpp.org/ftp/tsg_ran/WG1_RL1/TSGR1_75/Docs/R1-135115.zip) See pp. 1-5, 5 pages.
International Preliminary Report on Patentability for PCT /US2013/076379, dated Jun. 30, 2016, 8 pages.
Office Action for European Patent Application No. 13899946.1, dated Jun. 12, 2018, 9 pages.

* cited by examiner

APPARATUS, SYSTEM AND METHOD OF DYNAMIC ALLOCATION OF RADIO RESOURCES TO WIRELESS COMMUNICATION LINKS OF A PLURALITY OF TYPES

TECHNICAL FIELD

Embodiments described herein generally relate to dynamic allocation of radio resources.

BACKGROUND

Some cellular communication networks may be deployed according to a wireless network topology involving a plurality of small cells, which may be employed to exchange information with mobile users. Such small cells may substantially increase entire network capacity.

However, deployments involving large numbers of small cells may require a very well developed infrastructure to provide adequate core network access. Such infrastructure may be bulky and/or expensive.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
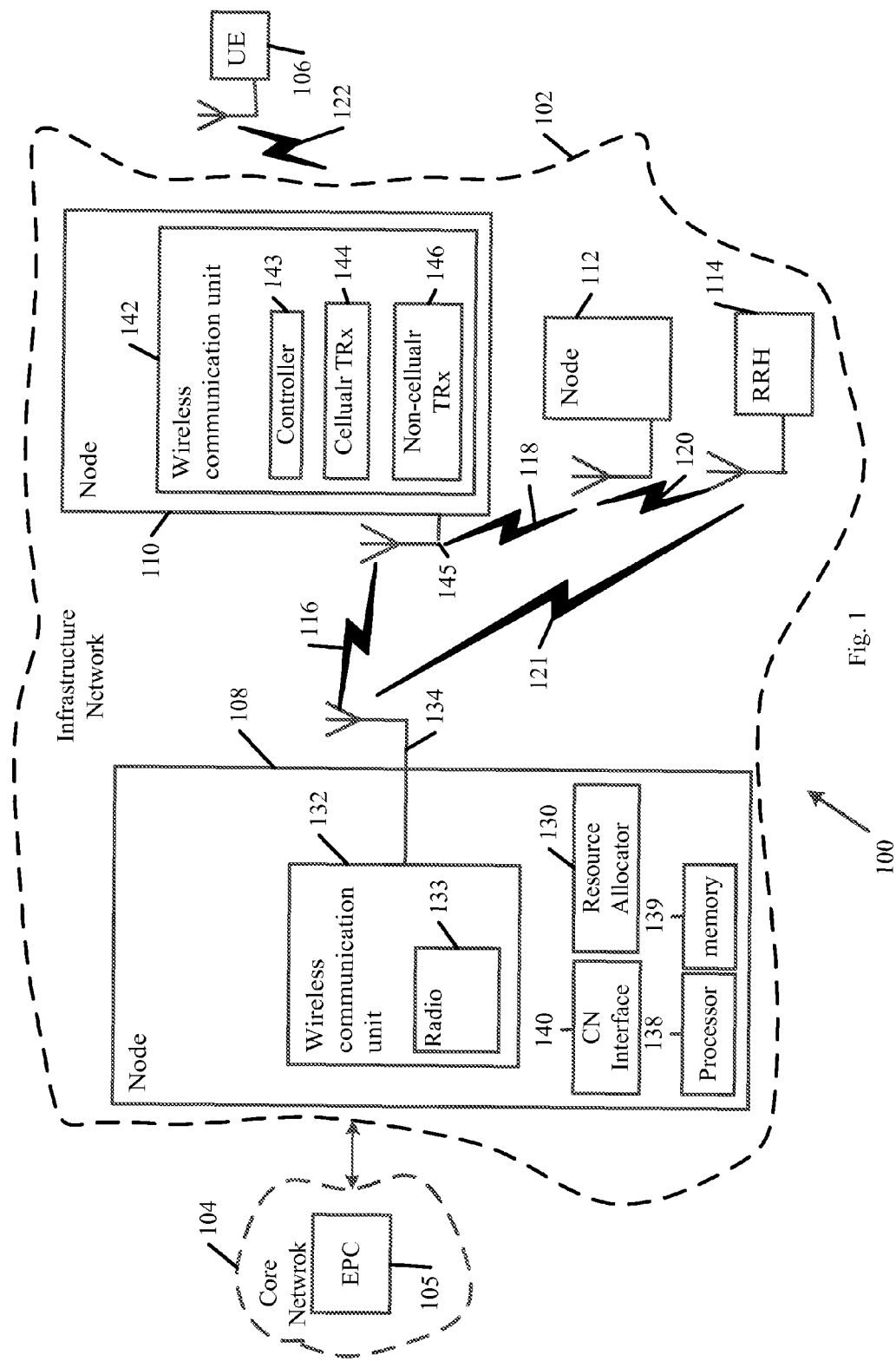
FIG. 1 is a schematic block diagram illustration of a wireless communication system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, one way and/or two-way radio communication systems, cellular radio-telephone communication systems, a node, a base station, a server computer, a wireless communication station, a wireless communication device, a wireless Access Point (AP), a wired or wireless router, a wired or wireless modem, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, multi-standard radio devices or systems, and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications, Mar.* 29, 2012; *IEEE802.11task group ac (TGac) ("IEEE802.11-09/0308r12—TGac Channel Model Addendum Document"); IEEE* 802.11 *task group ad (TGad) (IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY)*

Specifications—Amendment 3: Enhancements for Very High Throughput in the 60 GHz Band, 28 Dec., 2012)) and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification version 1.2*, 2012) and/or future versions and/or derivatives thereof, devices and/or networks operating in accordance with existing Long Term Evolution (LTE) specifications (including *ETSI TS* 136 300 *V*11.3.0 (2012-11): *LTE; Evolved Universal Terrestrial Radio Access (E-UTRA) and Evolved Universal Terrestrial Radio Access Network (E-UTRAN); Overall description; Stage* 2 (3*GPP TS* 36.300 *version* 11.3.0 *Release* 11), 2012) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular network. However, other embodiments may be implemented in any other suitable cellular network, e.g., a 3G cellular network, a 4G cellular network, a 5G cellular network, a WiMax cellular network, and the like.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a Wireless-Gigabit (WiGig) frequency band, e.g., according to the WGA specification, a WiFi frequency band, a Wi-Fi Direct frequency band, a frequency band according to the IEEE 802.11 standards, e.g., according to IEEE 802.11ad ("the 802.11ad frequency band"), a frequency band according to the Wi-FI standards, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

Some demonstrative embodiments are described herein with respect to mmWave radio resources and/or mmWave wireless communication links, however other embodiments may be used in conjunction with any other suitable radio resources and/or any other wireless communication links.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macro cells to small cells, for example, picocells and femtocells.

Other embodiments may be used in conjunction with any other suitable wireless communication network.

Reference is now made to FIG. 1, which schematically illustrates a block diagram of a wireless communication system 100, in accordance with some demonstrative embodiments.

In some demonstrative embodiments, wireless communication system 100 may include a cellular communication network, a broadband mobile radio network, or any other network.

For example, In some demonstrative embodiments, wireless communication system 100 may include a Global System for Mobile (GSM) network, a Universal Mobile Telecommunications System (UMTS) network, a Long Term Evolution (LTE) network, an LTE-advanced network, a Fifth Generation (5G) network, or any other network.

In some demonstrative embodiments, wireless communication system 100 may include an infrastructure network 102 to communicate between a Core Network (CN) 104 and a plurality of User Equipment (UEs) 106, e.g., as described below. Core network 104 may include, for example, a telephone network, the Internet, a Local Area Network (LAN), and the like. For example, CN 104 may include an Evolved Packet Core (EPC) 105, a Radio Network Controller (RNC), and/or any other element, which may control communication with UEs 106.

In some demonstrative embodiments, infrastructure network 102 may include one or more wireless communication devices capable of communicating content, data, information and/or signals via a wireless medium (WM). The wireless medium may include, for example, a radio channel, a mmWave channel, a cellular channel, an RF channel, a Wireless Fidelity (WiFi) channel, a WiGig channel, an IR channel, and the like. One or more elements of system 100 may optionally be capable of communicating over any suitable wired communication links.

In some demonstrative embodiments, one or more elements of infrastructure network 102 may perform the functionality of a HetNet, which may utilize a deployment of a mix of technologies, frequencies, cell sizes and/or network architectures, for example, including cellular, WLAN, and/or the like.

In some demonstrative embodiments, The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In some demonstrative embodiments, the HetNet may be configured to provide a service through a first wireless communication environment, e.g., a cellular network, and to maintain the service when switching to another communication environment, e.g., WLAN.

In one example, infrastructure network 102 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment, e.g., configured to augment network capacity. For example, the small cells may be deployed within the coverage area of the macro cells.

In another example, infrastructure network 102 may utilize Multi-RAT small cells integrating multiple radios such as WiFi and 3GPP air interfaces in a single infrastructure device, e.g., as described below.

In other embodiments, infrastructure network 102 may implement any other architecture and/or deployment.

In some demonstrative embodiments, infrastructure network 102 may be deployed to include a network of a plurality of cells, e.g., small cells, which may be configured, for example, to deliver data to/from mobile users in order, for example, to substantially increase the throughput of the entire network.

In some demonstrative embodiments, a cell may include a wireless communication node, which may be configured to cover and/or serve a plurality of users, for example, mobile devices, e.g., User Equipment (UE), nodes of one or more other cells, e.g., other small cells, relay nodes, and the like. The wireless communication node may include or perform the functionality of a Base Station (BS), an Access Point (AP), a Node B, an LTE node, an LTE evolved node B (eNB), and the like. The deployment of the small cells may provide, for example, high-speed wireless access for communication by many users, e.g., simultaneously.

In some demonstrative embodiments, the size of a small cell may be configured, for example, such that the wireless communication node may be able to cover the small cell. In one example, the small cell may have a coverage range of about 10-100 meters, or any other range.

In some demonstrative embodiments, a relatively large number of small cell base stations may be deployed to cover substantial areas such as a city or several blocks in the city. In one example, elements of infrastructure network 102 may be deployed, for example, in outdoor spaces, e.g., a street, a stadium, and the like, and/or large indoor areas, e.g., conference halls, and the like.

In some demonstrative embodiments, infrastructure network 102 may include one or more nodes, e.g., including a node 108, to control one or more macro cells. For example, node 108 may include an anchor node, e.g., an anchor eNB or any other node or base station.

In some demonstrative embodiments, node 108 may include a CN interface 140 to communicate with CN 104, for example, via a suitable signaling interface, e.g., an S1 signaling interface or any other interface. For example, CN interface 140 may communicate with CN 104 via one or more wired and/or wireless connections, e.g., via a wire, a cable, a fiber, an optic connection, and the like. For example, CN interface 140 may include a modulator-demodulator (Modem), a Cable Modem, a router, and the like.

In some demonstrative embodiments, infrastructure network 102 may include one or more nodes, e.g., including a node 110 and/or a node 112, to control one or more small cells. For example, nodes 110 and/or 112 may include a booster node, e.g., a booster eNB, a relay node, e.g., a relay eNB or any other relay node, a Node B, an eNB, or any other node or base station.

In some demonstrative embodiments, infrastructure network 102 may also include one or more additional elements and/or devices, for example, one or more Remote Radio Head (RRH) devices 114, which may be configured, for example, to extend the coverage of one or more nodes of infrastructure network 102.

In some demonstrative embodiments, communication within system 100 may be performed via communication links of a plurality of types, e.g., as described below.

In some demonstrative embodiments, elements of system 100 may utilize one or more access links to communicate between elements of infrastructure network 102 and UEs 106. In one example, an access link may include a wireless communication link between a node of infrastructure network 102, e.g., nodes 108, 110 and/or 112, and a UE 106. In another example, an access link may include a wireless communication link between a RRH 114 and a UE 106.

In some demonstrative embodiments, the access links may include cellular communication links, for example, LTE links, 3GPP links, and the like.

In some demonstrative embodiments, one or more access links may include non-cellular wireless communication links, e.g., as described below.

In some demonstrative embodiments, elements of system 100 may utilize one or more backhaul links to communicate between nodes of infrastructure network 102, e.g., as described below.

In some demonstrative embodiments, elements of system 100 may utilize one or more fronthaul links to communicate between one or more nodes of infrastructure network 102 and one or more RRHs 114, e.g., as described below.

In some demonstrative embodiments, one or more elements of infrastructure network 102 may be configured to utilize non-cellular radio resources for communication over one or more non-cellular wireless communication links, e.g., as described below.

In some demonstrative embodiments, the non-cellular radio resources may be utilized to complement the operation of the cellular mobile broadband system, e.g., as described below.

In some demonstrative embodiments, the non-cellular radio resources may correspond to radio resources that are not intended to provide contiguous coverage.

In some demonstrative embodiments, the non-cellular radio resources may be used for highly directive, e.g., beamformed wireless communication links.

In some demonstrative embodiments, elements of system 100 may utilize one or more non-cellular access links 122 to communicate between elements of infrastructure network 102 and UEs 106.

In some demonstrative embodiments, nodes 108, 110 and/or 112 may utilize one or more non-cellular access links 122 to communicate with UEs 106.

In one example, a node, e.g., node 110, may utilize a non-cellular access link 122 to a UE 106 to compliment a cellular access link to the UE 106, e.g., as described below.

In another example, a node, e.g., node 112, may utilize a non-cellular access link 122 as an exclusive link to a UE 106, e.g., as described below.

In some demonstrative embodiments, a RRH 114 may utilize a non-cellular access link 122 to communicate with a UE 106, e.g., as described below.

In some demonstrative embodiments, one or more nodes of infrastructure network 102 may utilize one or more non-cellular wireless backhaul links to communicate with one or more other nodes of infrastructure network 102.

In some demonstrative embodiments, a macro cell node may utilize one or more non-cellular wireless backhaul links to communicate with one or more small cell nodes.

In some demonstrative embodiments, a small cell node may utilize one or more non-cellular wireless backhaul links to communicate with one or more other small cell nodes.

In one example, node 108 may communicate with node 110 via a non-cellular wireless backhaul link 116.

In another example, node 110 may communicate with node 112 via a non-cellular wireless backhaul link 118.

In some demonstrative embodiments, one or more nodes of infrastructure network 102 may utilize one or more non-cellular wireless fronthaul links to communicate with one or more RRHs 114.

In some demonstrative embodiments, a macro cell node may utilize one or more non-cellular wireless fronthaul links to communicate with one or more RRHs.

In some demonstrative embodiments, a small cell node may utilize one or more non-cellular wireless fronthaul links to communicate with one or more RRHs.

In one example, node 108 may communicate with RRH 114 via a non-cellular wireless fronthaul link 121.

In another example, node 112 may communicate with RRH 114 via a non-cellular wireless fronthaul link 120.

In some demonstrative embodiments, the non-cellular wireless communication links may include direct connection between two elements of infrastructure network 102, e.g., a direct connection between a booster node, e.g., node 110 and/or node 112, and an anchor node, e.g., node 108. Additionally or alternatively, the non-cellular wireless communication links may include indirect links, which may be created, for example, in a multihop manner, e.g., by relays.

In some demonstrative embodiments, the non-cellular wireless communication links may include Wireless Local Area Network (WLAN) links.

In some demonstrative embodiments, the non-cellular wireless communication links may include high-throughput links.

In some demonstrative embodiments, the non-cellular wireless communication links may include wireless communication links over a high frequency band, for example, mmWave links over the mmWave frequency band, e.g., as described below. In one example, the mmWave links may include DMG links, links according to the WiGig specifications ("WiGig links"), links according to the IEEE 802.11 ad specification ("802.11 ad links"), and the like.

In other embodiments, the wireless backhaul links may include any other wireless communication links over any other wireless communication frequency band and/or according to any other wireless communication standard and/or specification.

In some demonstrative embodiments, the non-cellular radio resources may include frequency domain resources, e.g., mmWave frequency domain resources; time domain resources, e.g., mmWave time domain resources; code resources, e.g., mmWave code resources; spatial resources, e.g., mmWave spatial resources; power resources, e.g., mmWave power resources, and/or any other type of radio resources and/or any combination of two or more of the attributes.

In some demonstrative embodiments, elements of infrastructure network 102 may include one or more wireless communication units to communicate over one or more wireless communication links, for example, wireless access links, wireless backhaul links and/or wireless fronthaul links, as described below.

In some demonstrative embodiments, node 108 may include a wireless communication unit 132 to communicate over one or more non-cellular wireless backhaul links, e.g., link 116, one or more non-cellular wireless access links 122, and/or one or more non-cellular wireless fronthaul links, e.g., link 121.

In some demonstrative embodiments, wireless communication unit 132 may be configured to communicate directly with UEs 106 over one or more cellular access links (not shown in FIG. 1).

In some demonstrative embodiments, node 110, node 112 and/or RRH 114 may include a wireless communication unit 142 to communicate over one or more non-cellular wireless communication links and/or one or more cellular links.

In some demonstrative embodiments, wireless communication unit 132 and/or wireless communication unit 142 may include one or more radios 133, e.g., including one or more wireless transmitters, receivers and/or transceivers able to send and/or receive wireless communication signals, RF signals, frames, blocks, transmission streams, packets, messages, data items, and/or data.

In some demonstrative embodiments, wireless communication unit 132 may include, or may be associated with, one or more antennas 134, and/or wireless communication unit 142 may include, or may be associated with, one or more antennas 145.

In some demonstrative embodiments, antennas 134 and/or 145 may include any type of antennas suitable for transmitting and/or receiving wireless communication signals, blocks, frames, transmission streams, packets, messages and/or data. For example, antennas 134 and/or 145 may include any suitable configuration, structure and/or arrangement of one or more antenna elements, components, units, assemblies and/or arrays. Antennas 134 and/or 145 may include, for example, antennas suitable for directional communication, e.g., using beamforming techniques. For example, antennas 134 and/or 145 may include a phased array antenna, a multiple element antenna, a set of switched beam antennas, and/or the like. In some embodiments, antennas 134 and/or 145 may implement transmit and receive functionalities using separate transmit and receive antenna elements. In some embodiments, antennas 134 and/or 145 may implement transmit and receive functionalities using common and/or integrated transmit/receive elements.

In some demonstrative embodiments, wireless communication unit 142 may include a non-cellular transceiver 146 to communicate over one or more non-cellular links, for example, one or more non-cellular backhaul links, one or more non-cellular fronthaul links, and/or one or more non-cellular access links.

In one example, node 110, node 112 and/or RRH may utilize non-cellular transceiver (TRx) 146 to communicate over no-cellular links 116, 118, 120, 121 and/or 122.

In some demonstrative embodiments, wireless communication unit 142 may include a cellular transceiver (TRx) 144 to communicate over one or more cellular links, for example, one or more cellular access links, e.g., 3GPP access links, LTE access links, and the like.

In one example, node 110, node 112 and/or RRH may utilize cellular transceiver 144 to communicate over one or more cellular access links with UEs 106.

In another example, node 108 may utilize a cellular transceiver 144 to communicate over one or more cellular access links with UEs 106 (not shown in FIG. 1).

In some demonstrative embodiments, wireless communication unit 142 may include a controller 143 to control communications performed by wireless communication unit 142, e.g., via transceivers 144 and/or 146 and/or other links, e.g., as described below.

In some demonstrative embodiments, one or more of nodes 108, 110, 112 and/or RRH 114 may also include, for example, a processor 138 and/or a memory unit 139. one or more of nodes 108, 110, 112 and/or RRH 114 may optionally include other suitable hardware components and/or software components. In some demonstrative embodiments, some or all of the components of nodes 108, 110, 112 and/or RRH 114 may be enclosed in a common housing or packaging, and may be interconnected or operably associated using one or more wired or wireless links. In other embodiments, components of nodes 108, 110, 112 and/or RRH 114 may be distributed among multiple or separate devices.

Processor 138 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 138 executes instructions, for example, of an Operating System (OS) of node 108 and/or of one or more suitable applications.

Memory unit 139 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Memory unit 139, for example, may store data processed by node 108.

In some demonstrative embodiments, the non-cellular radio resources may be shared between the plurality of types of non-cellular wireless communication links, e.g., between the non-cellular wireless backhaul links, the non-cellular wireless fronthaul links and/or the non-cellular wireless access links.

In some demonstrative embodiments, mmWave links may enable wide communication bandwidths.

However, the bandwidth of the mmWave links may not be sufficient for some types of communication, e.g., over the wireless backhaul links. In one example, in operational cases with a high share of delay sensitive data, the bandwidth (BW) for the delay sensitive data may be insufficient. The BW needs for the delay sensitive data may be driven, for example, by choosing a reliable Modulation and Coding scheme (MCS) and/or utilizing fast Hybrid Automatic Repeat Request (HARM) re-transmissions on the wireless backhaul links. The BW needs may vary, for example, with the share of delay sensitive services.

In some demonstrative embodiments, utilizing a fixed allocation of the non-cellular radio resources may result in limitations on the ability to provide low delay high BW resources to the delay sensitive services.

In addition, the non-cellular wireless communication links may be sensitive to environment conditions.

For example, a mmWave link may be sensitive to atmospheric conditions, e.g., in terms of propagation conditions. In one example, some frequency bands, e.g., the 20-30 and 60 Gigahertz (GHz) bands may be sensitive to $H_2O$ and $O_2$ absorption effects. The mmWave link may vary, for example, depending on short-term variations, e.g. rainfall, or long-term variations, e.g., seasonal foliage changes.

As a result, using a preset resource allocation of mmWave resources between the various types of mmWave links, e.g., the mmWave backhaul, access and/or fronthaul links, may result in an initially selected radio resource capacity becoming insufficient to support actual link requirements, for example, a result of an increased capacity requirements, e.g., due to an increase in delay sensitive services share, and/or a loss of available channel capacity, e.g., due to atmospheric effects.

In some demonstrative embodiments, the non-cellular resources, which may be used by the non-cellular backhaul links, may be shared with additional types of links, e.g., the non-cellular wireless access links and/or the non-cellular wireless fronthaul links, e.g., as described above. This sharing of the same non-cellular radio resource "pool" may pose additional limitations on the utilization of the non-cellular radio resources.

Some demonstrative embodiments may be implemented to enable dynamically adjusting the assignment of the non-cellular radio resources, e.g., from a "pool" of common non-cellular radio resources, among a plurality of types of non-cellular wireless communication links, e.g., one or more non-cellular wireless backhaul link, one or more non-cellular wireless front haul links, and/or one or more non-cellular wireless access links.

In some demonstrative embodiments, implementing a fixed, predefined allocation of the non-cellular resources may be inefficient, suboptimal and/or disadvantageous.

For example, a fixed and preset splitting the non-cellular radio resources into a fixed share of radio resources for access links, a fixed share of radio resources for backhaul links, and a fixed share of radio resources for fronthaul links, may result in the backhaul links being agnostic to changes in link capacity requirements, e.g., responsive to changes in Quality of Service (QoS) needs, and/or changes in channel conditions, e.g., responsive to atmospheric and/or environmental conditions.

Accordingly, fixed and preset splitting of the non-cellular radio resources may lead to a suboptimal use of the non-cellular radio resources.

Some demonstrative embodiments may enable dynamically allocating radio resources based on one or more allocation criteria, for example, according to channel capacity variations and/or according to channel capacity requirements, e.g., based on traffic QoS needs.

In some demonstrative embodiments, a pool of common radio resources may be dynamically allocated between a plurality of wireless communication link types.

In one example, the non-cellular radio resources may be dynamically allocated to at least three different types of links, e.g., mmWave backhaul links, mmWave fronthaul links, and mmWave access links.

In some demonstrative embodiments, system 100 may include a resource allocator 130 to dynamically allocate to a plurality of nodes of infrastructure network 102 non-cellular radio resources for communication over a plurality of non-cellular wireless communication links, e.g., as described below.

In some demonstrative embodiments, resource allocator 130 may be implemented as part of a node, for example, an anchor node of a macro cell, to dynamically allocate mmWave resources to mmWave links of one or more small cells within the coverage area of the macro cell.

In one example, node 108 may include resource allocator 130 to dynamically allocate mmWave resources to backhaul links 116 and/or 118, to fronthaul links 120 and/or 121, and/or to one or more access links 122, e.g., as described below.

In other embodiments, resource allocator 130 may be implemented as part of any other type of node and/or any other element of system 100. For example, resource allocator 130 may be implemented as part of EPC 105, for example, if EPC 105 is directly connected to control mmWave links of one or more elements of infrastructure network 102, e.g., as described below with reference to FIG. 3A.

In other embodiments, resource allocator 130 may be implemented as a distributed functionality in more than one instance of a node and/or element of the wireless communication system 100. For example, a first functional part of resource allocator 130 may be implemented as part of node 108, and a second functional part of resource allocator 130 may be implemented in at least one of the nodes 110, 112 or 114.

In some demonstrative embodiments, resource allocator 130 may assign the non-cellular radio resources to a plurality of resource blocks corresponding to a plurality of link types. For example, resource allocator 130 may assign the non-cellular radio resources according to a resource allocation scheme including a backhaul resource block, a fronthaul resource block and an access resource block, e.g., as described below with reference to FIG. 2.

In other embodiments, resource allocator 130 may assign the non-cellular radio resources according to any other resource allocation scheme and/or to any other number of link types.

In some demonstrative embodiments, resource allocator 130 may dynamically allocate to a non-cellular wireless communication link resources from a resource block corresponding to a link type of the non-cellular wireless communication link, e.g., as described below.

In some demonstrative embodiments, resource allocator 130 may dynamically adjust the boundaries between the resource blocks, for example, based on actual required capacity of the different link types and/or based on actual available capacity of the different non-cellular wireless communication links, e.g., as described below.

In some demonstrative embodiments, a first node, for example, a macro cell node, for example, an anchor node, e.g., node 108, may exchange information with one or more second nodes, for example small cell nodes within the coverage area of the macro cell node, for example, booster nodes connected to the anchor node, e.g., node 110, to enable resource allocator 130 to dynamically allocate the non-cellular radio resources.

For example, resource allocator 130 may collect quality data of various usages/applications of the non-cellular radio resources to be utilized by the second nodes, and may shift the borders between resource blocks, e.g., based on the capacity needs and/or the delay sensitivity of the services.

In some demonstrative embodiments, resource allocator 130 may collect, for example, from one or more nodes and/or one or more other elements of system 100, capability information relating to capacity capabilities of the non-cellular wireless communication links, and/or required capacity information relating to a required capacity of the non-cellular wireless communication links.

For example, resource allocator 130 may receive capability information relating to capacity capabilities of backhaul links 116 and/or 118, fronthaul links 120 and/or 121, and/or access links 122; and/or required capacity information relating to a required capacity of backhaul links 116 and/or 118, fronthaul links 120 and/or 121, and/or access links 122.

In some demonstrative embodiments, resource allocator may allocate the non-cellular radio resources to non-cellular wireless communication links based on the capability information and/or capacity information, e.g., to fit actual operational needs.

In some demonstrative embodiments, resource allocator 130 may allocate the non-cellular radio resources to the non-cellular wireless communication links based on at least one attribute of the plurality of non-cellular wireless communication links.

In some demonstrative embodiments, the at least one attribute may include, for example, a spatial arrangement of the non-cellular wireless communication links; a capacity of one or more of the non-cellular wireless communication links; an activity state of one or more of the non-cellular wireless communication links, e.g., whether a link is active or non-active; a load of one or more of the non-cellular wireless communication links; a link quality of one or more of the non-cellular wireless communication links; detected interference between the non-cellular wireless communication links; an anticipated interference between the non-cellular wireless communication links, and/or any other attribute, e.g., as described below.

In some demonstrative embodiments, resource allocator 130 may allocate the non-cellular radio resources to the plurality of non-cellular wireless communication links based on a topology of a deployment of nodes in infrastructure network 102, e.g., as described below.

Figure 2:
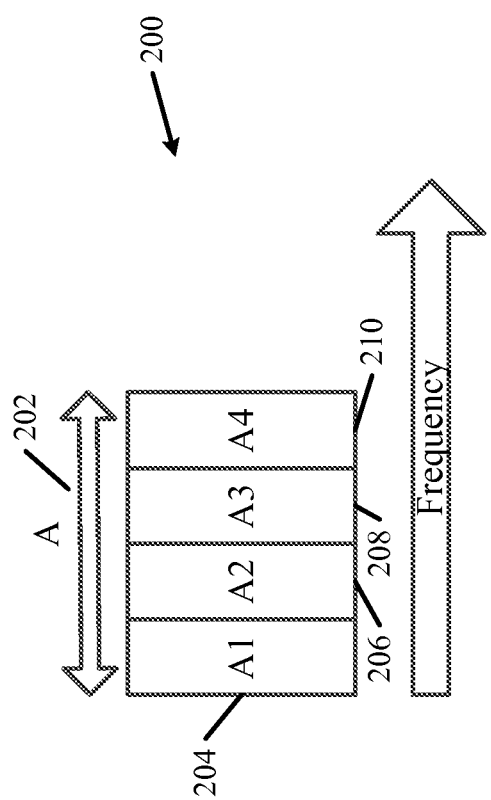
FIG. 2 is a schematic block diagram illustration of a radio resource allocation scheme, in accordance with some demonstrative embodiments.

Reference is made to FIG. 2, which schematically illustrates a radio resource allocation scheme 200, in accordance with some demonstrative embodiments.

In some demonstrative embodiments, resource allocator 130 (FIG. 1) may allocate the non-cellular radio resources to the plurality of non-cellular wireless communication links within infrastructure network 102 (FIG. 1) according to radio resource allocation scheme 200. In other embodiments, resource allocator 130 (FIG. 1) may allocate the non-cellular radio resources according to any other radio resource allocation scheme.

As shown in FIG. 2, radio resource allocation scheme 200 may include radio resources in the frequency domain. However, in other embodiments, the radio resource allocation scheme may include resources in any other domain and/or a combination of resources of two or more domains, e.g., as described above.

As shown in FIG. 2, a range 202 of available resources, denoted "A", may be assigned to a plurality of resource sub-blocks (also referred to as "resource blocks"), e.g., including a radio resource block 204, denoted A1, a radio resource block 206, denoted A2, a radio resource block 208, denoted A3, and a radio resource block 210, denoted A4.

In some demonstrative embodiments, radio resource block 204 may include an amount of radio resources assigned to a first type of wireless communication links, e.g., backhaul links.

In some demonstrative embodiments, radio resource block 206 may include an amount of radio resources assigned to a second type of wireless communication links, e.g., access links.

In some demonstrative embodiments, radio resource block 208 may include an amount of radio resources assigned to a third type of wireless communication links, e.g., fronthaul links.

In some demonstrative embodiments, open resource block 210 may be optional.

In some demonstrative embodiments, radio resource block 210 may include an open resource block including an unassigned amount of radio resources. The radio resources of resource block 210 may be utilized as a pool of radio resources, which may be dynamically assigned by resource allocator 130 (FIG. 1) to one or more of blocks 204, 206 and 208, if needed. For example, open resource block 210 may be used by resource allocator 130 (FIG. 1) to maintain part of the radio resources as back up, for example, for very dynamic adaptations of resource allocations, e.g., as described below.

In some demonstrative embodiments, some of available radio resources 202 may be allocated to a reserved block of resources (not shown in FIG. 2), which may be reserved for control plane signaling, e.g., between node 108, and other nodes within the coverage area of node 108, e.g., via an X2 interface or any other interface. For example, the reserved radio resources may be used for communicating feedback information from nodes 110 and/or 112 (FIG. 1) to node 108 (FIG. 1) and/or for communicating resource allocation information from node 108 (FIG. 1) to nodes 110 and/or 112 (FIG. 1), e.g., as described below.

In some demonstrative embodiments, resource allocator 130 (FIG. 1) may determine an amount of required resources to be provided to the backhaul links ("backhaul resource needs") corresponding to one or more small cells within the coverage area of node 108.

For example, resource allocator 130 (FIG. 1) may determine the backhaul resource needs of a small cell, based on one or more attributes of services provided by the small cell to one or more UEs via one or more non-cellular wireless access links; based on one or more attributes of services provided by the small cell to one or more UEs via one or more cellular access links; based on an amount and/or share of services having delay time constraints, e.g., voice, video, IP Multimedia Subsystem (IMS) signaling, real-time applications, and the like; based on an actual quality of the backhaul links; based on one or more other links, e.g., other backhaul links, fronthaul links and/or access links, which are to communicate information, which is communicated via backhaul link 116, and/or based on any other additional or alternative information.

In some demonstrative embodiments, resource allocator 130 (FIG. 1) may determine an amount of required resources to be provided to the access links ("access resource needs") corresponding to one or more small cells within the coverage area of node 108. For example, resource allocator 130 (FIG. 1) may determine the access resource needs of a small cell based on an aggregate amount of radio resources to serve all UEs within the small cell via one or more non-cellular wireless access links, e.g., as described below.

In some demonstrative embodiments, resource allocator 130 (FIG. 1) may determine an amount of required resources to be provided to the fronthaul links ("fronthaul resource needs") within the coverage area of node 108. For example, the fronthaul links may be in a baseband domain, e.g., using a Common Public Radio Interface (CPRI) or an Open BBU RRH Interface (OBRI). Accordingly, the fronthaul links may depend on BW needs for I/Q sampling of data. As a result the fronthaul links may be agnostic to load and type of service.

Therefore, in some demonstrative embodiments, resource allocator 130 (FIG. 1) may determine the fronthaul resource needs based a number of RRHs supported within the coverage area of node 108.

In some demonstrative embodiments, resource allocator 130 (FIG. 1) may assign the available radio resources 202 to resource blocks 204, 206 and/or 208 based on the backhaul resource needs, the access resource needs and/or the fronthaul resource needs.

In some demonstrative embodiments, resource allocator 130 (FIG. 1) may adjust the assignment of available radio resources 202 to resource blocks 204, 206 and/or 208, for example, by adjusting the boundaries between resource blocks 204, 206, 208 and/or 210, based on changes in the backhaul resource needs, the access resource needs and/or the fronthaul resource needs.

In some demonstrative embodiments, resource allocator 130 (FIG. 1) may assign and/or adjust the assignment of available radio resources 202 to resource blocks 204, 206 and/or 208, for example, based on at least one static and/or time variant criterion, for example, network topology, e.g., activation/deactivation of nodes, vicinity of nodes, e.g., as a result of moving nodes, link quality, e.g., atmospheric conditions, and/or projected and/or detected interference on at least one of the non-cellular communication links.

In some demonstrative embodiments, node 110 (FIG. 1) may transmit to node 108 (FIG. 1), e.g., via backhaul link 116 (FIG. 1) or any other feedback or control link, information related to a needed capacity of backhaul link 116 (FIG. 1).

For example, node 110 (FIG. 1) may transmit to node 108 (FIG. 1), e.g., via backhaul link 116 (FIG. 1) or any other feedback or control link, information related to non-cellular radio resources needed for one or more non-cellular wireless communication links between node 110 (FIG. 1) and one or more other elements of system 100 (FIG. 1), which are directly connected to node 110 (FIG. 1) and/or indirectly connected to node 110 (FIG. 1).

In one example, node 110 (FIG. 1) may transmit to node 108 (FIG. 1) information related to non-cellular radio resources needed for backhaul link 118 (FIG. 1) between node 110 (FIG. 1) and node 112 (FIG. 1); for a fronthaul link 120 (FIG. 1) between RRH 114 (FIG. 1) and node 112 (FIG. 1), which is connected to node 110 (FIG. 1) via backhaul link 118 (FIG. 1); for a mmWave access link 122 (FIG. 1) between node 110 (FIG. 1) and UE 106 (FIG. 1); for a cellular access link between node 110 (FIG. 1) and UE 106 (FIG. 1), e.g., if traffic via the cellular link is to be communicated via backhaul link 116 (FIG. 1); for a mmWave access link 122 (FIG. 1) between node 112 (FIG. 1) and UE 106 (FIG. 1), e.g., if traffic via the cellular link is to be communicated via backhaul links 118 and 116 (FIG. 1); for a cellular access link between node 110 (FIG. 1) and UE 106 (FIG. 1), e.g., if traffic via the cellular link is to be communicated via backhaul link 116 (FIG. 1); for a mmWave access link 122 (FIG. 1) between RRH 114 (FIG. 1) and UE 106 (FIG. 1), e.g., if traffic via mmWave access link 122 (FIG. 1) is to be communicated via backhaul links 116 (FIG. 1) and 118 (FIG. 1), and fronthaul link 120 (FIG. 1) and/or via backhaul link 121 (FIG. 1); and/or for a cellular access link between RRH 114 (FIG. 1) and UE 106 (FIG. 1), e.g., if traffic via the cellular link is to be communicated via backhaul links 116 (FIG. 1) and 118 (FIG. 1), and fronthaul link 120 (FIG. 1) and/or via backhaul link 121 (FIG. 1).

In some demonstrative embodiments, resource allocator 130 (FIG. 1) may adjust the allocation of the radio resources of block 204 to backhaul link 116 (FIG. 1), e.g., based on the information from node 110 (FIG. 1).

In some demonstrative embodiments, resource allocator 130 (FIG. 1) may transmit to node 110 (FIG. 1) an allocation message, e.g., via link 116 (FIG. 1) or any other feedback or control link, including an indication of the amount of resources allocated to backhaul link 116 (FIG. 1) from resource block 204, an indication of the amount of resources allocated to backhaul link 118 (FIG. 1) from resource block 204, an indication of the amount of resources allocated to fronthaul link 120 (FIG. 1) from resource block 208, an indication of the amount of resources allocated to fronthaul link 121 (FIG. 1) from resource block 208, and/or an indication of the amount of resources allocated to one or more access links 122 (FIG. 1) from resource block 206.

In some demonstrative embodiments, node 110 (FIG. 1) may receive the allocation message and may adjust the allocation of radio resources to links 116, 118, 120 and/or 122 (FIG. 1).

In one example, controller 143 (FIG. 1) may transmit node 108 (FIG. 1) capacity information relating to a required capacity of mmWave links 118, 122 and/or 120 (FIG. 1), e.g., as described above. According to this example, controller 143 (FIG. 1) may receive from node 108 (FIG. 1) an allocation of mmWave radio resources to be allocated to mmWave links 118, 122 and/or 120 (FIG. 1) according to resource allocation scheme 200, e.g., as described above.

Figures 3A, 3B, 3C, 3D:
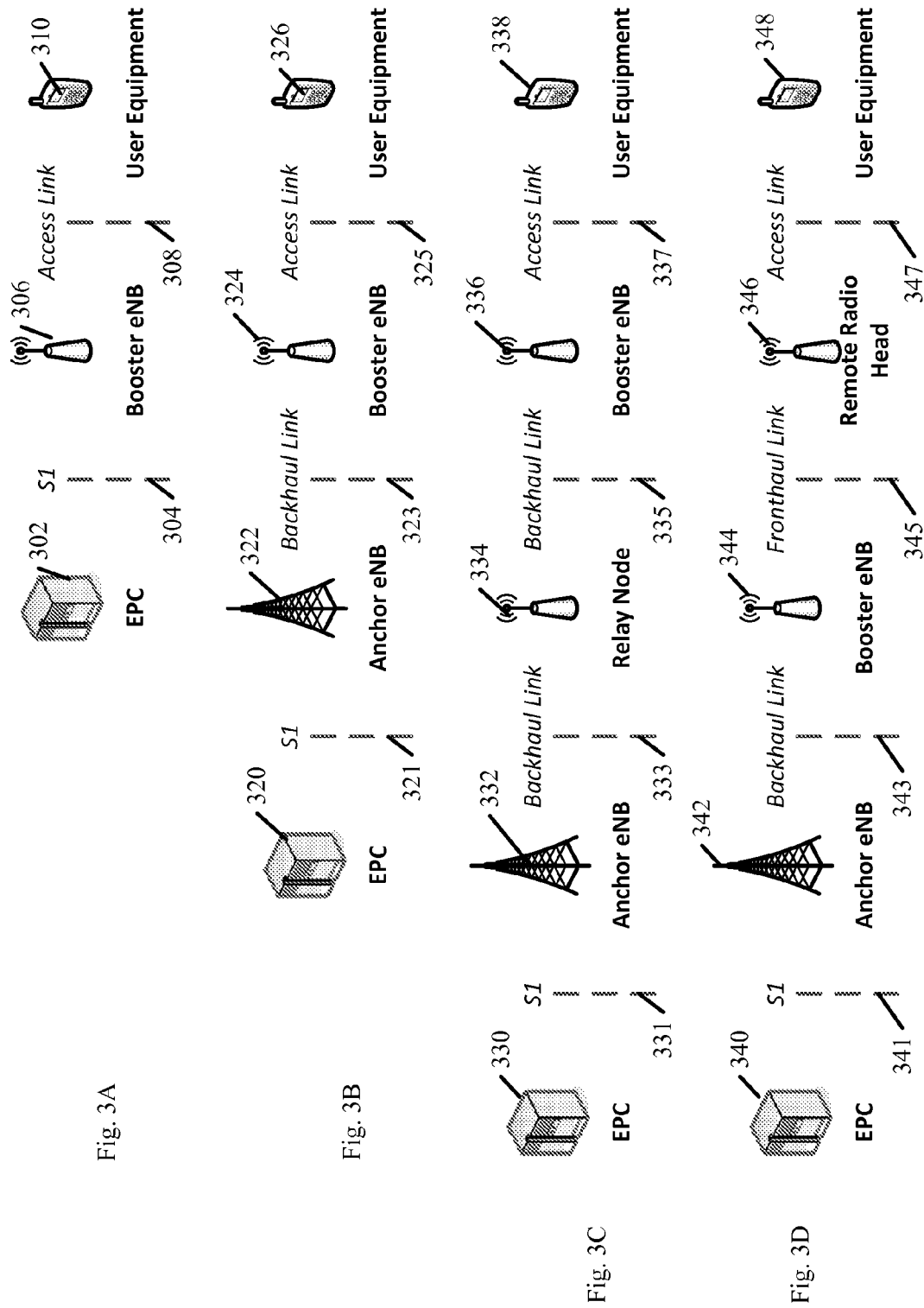
FIGS. 3A, 3B, 3C, and 3D are schematic block diagram illustrations of four respective deployments of a cellular communication system, in accordance with some demonstrative embodiments.

Reference is made to FIG. 3A, which schematically illustrates a first deployment of a cellular communication system, in accordance with some demonstrative embodiments.

As shown in FIG. 3A, an EPC 302 of a core network may be connected directly to a booster eNB 306, e.g., via a S1 signaling interface 304. The booster eNB 306 may communicate with a UE 310 via a mmWave access link 308.

In some demonstrative embodiments, EPC 302 may include resource allocator 130 (FIG. 1) to allocate to booster eNB 306 mmWave resources for mmWave access link 310.

Reference is made to FIG. 3B, which schematically illustrates a second deployment of a cellular communication system, in accordance with some demonstrative embodiments.

As shown in FIG. 3B, an EPC 320 of a core network may be connected directly to an anchor eNB 322, e.g., via a S1 signaling interface 321. The anchor eNB 322 may communicate with at least one booster eNB 324 via a mmWave backhaul link 323. For example, anchor eNB 322 may control a macro cell, and booster eNB 322 may control a small cell within the coverage area of the macro cell. The booster eNB 324 may communicate with a UE 326 via a mmWave access link 325.

In some demonstrative embodiments, anchor eNB 322 may include resource allocator 130 (FIG. 1) to allocate to booster eNB 324 mmWave resources for mmWave backhaul link 323, and to allocate to booster eNB 324 mmWave resources for mmWave access link 325.

Reference is made to FIG. 3C, which schematically illustrates a third deployment of a cellular communication system, in accordance with some demonstrative embodiments.

As shown in FIG. 3C, an EPC 330 of a core network may be connected directly to an anchor eNB 332, e.g., via a S1 signaling interface 331. The anchor eNB 332 may communicate with at least one relay node 334 via a mmWave backhaul link 333. The relay node 334 may communicate with at least one booster eNB 336 via a mmWave backhaul link 335. For example, anchor eNB 332 may control a macro cell, and booster eNB 336 may control a small cell connected to eNB 332 via relay node 334. The booster eNB 336 may communicate with a UE 338 via a mmWave access link 337.

In some demonstrative embodiments, anchor eNB 332 may include resource allocator 130 (FIG. 1) to allocate to relay node 334 mmWave resources for mmWave backhaul link 333 and 335, to allocate to booster eNB 336 mmWave resources for mmWave backhaul link 335, and to allocate to booster eNB 336 mmWave resources for mmWave access link 337.

Reference is made to FIG. 3D, which schematically illustrates a fourth deployment of a cellular communication system, in accordance with some demonstrative embodiments.

As shown in FIG. 3D, an EPC 340 of a core network may be connected directly to an anchor eNB 342, e.g., via a S1 signaling interface 341. The anchor eNB 342 may communicate with at least one booster eNB 344 via a mmWave backhaul link 343. For example, anchor eNB 342 may control a macro cell, and booster eNB 344 may control a small cell within the coverage area of anchor eNB 342. The booster eNB 344 may communicate with a RRH 346 via a mmWave fronthaul link 345. The RRH 346 may communicate with a UE 348 via a mmWave access link 347.

In some demonstrative embodiments, anchor eNB 342 may include resource allocator 130 (FIG. 1) to allocate to booster eNB 344 mmWave resources for mmWave backhaul link 343, to allocate to booster eNB 344 and RRH 346 mmWave resources for mmWave fronthaul link 345, and to allocate to RRH 346 mmWave resources for mmWave access link 347.

The deployments described above with respect to FIGS. 3A-3D are only some demonstrative deployments, in accordance with some demonstrative embodiments. Any other deployment may be implemented in other embodiments.

In some demonstrative embodiments, resource allocator 130 (FIG. 1) may be implemented as part of an EPC or an anchor node. In other embodiments, resource allocator 130 (FIG. 1) may be implemented as part of any other element, e.g., any other node of system 100 (FIG. 1) and/or a functionality of resource allocator 130 (FIG. 1) may be distributed between two or more elements, e.g., as described above.

Figure 4:
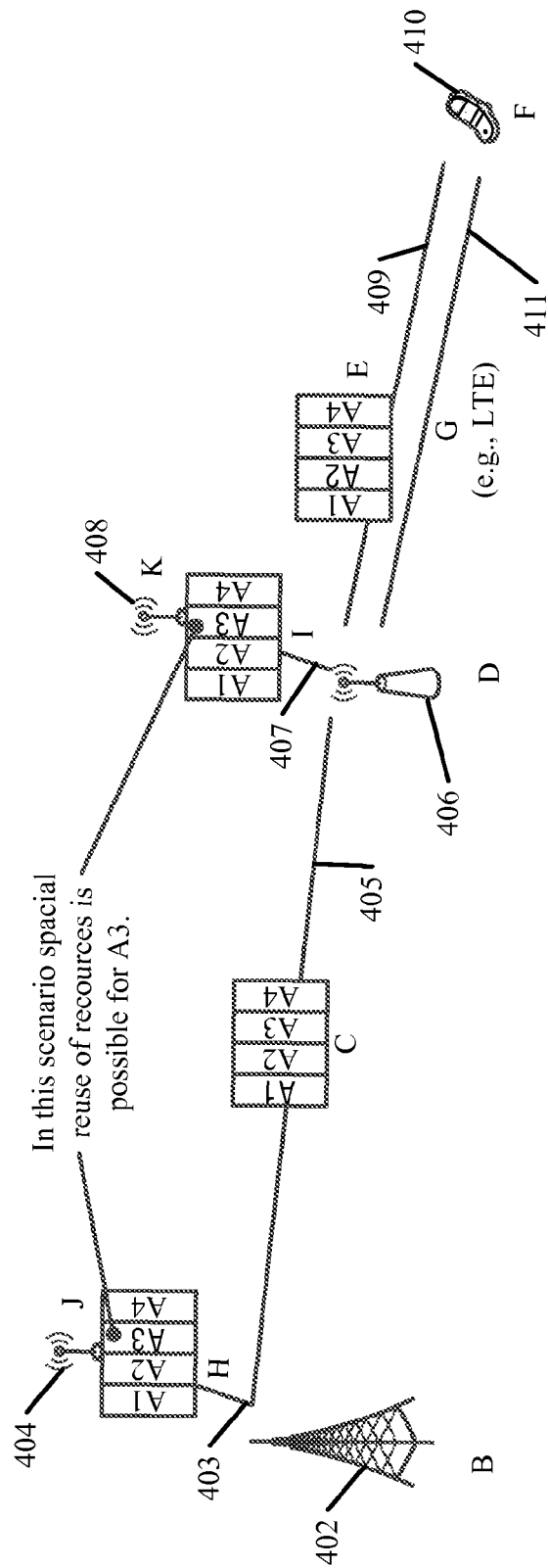
FIG. 4 is a schematic block diagram illustration of an allocation of radio resources in a deployment of a cellular communication system, in accordance with some demonstrative embodiments.

FIG. 4 schematically illustrates an allocation of radio resources in a deployment of a cellular communication system 400, in accordance with some demonstrative embodiments.

As shown in FIG. 4, an anchor node 402 may communicate directly with a RRH 404 via a mmWave fronthaul link 403, and may communicate directly with a booster node 406 via a mmWave backhaul link 405. Booster node 406 may communicate with a RRH 408 via a mmWave fronthaul link 407.

As shown in FIG. 4, booster node 406 may communicate with a UE 410 via a mmWave access link 409. Booster node 406 may optionally also communicate with UE 410 via a cellular access link 411, e.g., as described below.

In some demonstrative embodiments, anchor node 402 may include a resource allocator, e.g., resource allocator 130 (FIG. 1), to allocate mmWave resources to mmWave links 403, 405, 407 and/or 409, for example, according to resource allocation scheme 200 (FIG. 2), e.g., as described below.

In some demonstrative embodiments, anchor node 402 may determine a backhaul capacity need for backhaul link 405, for example, based on configuration data corresponding to the link 405.

In some demonstrative embodiments, anchor node 402 may have information defining the resource range 200 (FIG. 2), the number and/or assignment of resource blocks within resource allocation scheme 200 (FIG. 2), default capacity settings and/or application usage of links 403, 405, 407, 409, and/or 411, and/or any other information related to resource allocation scheme 200 (FIG. 2) and/or links 403, 405, 407, 409, and/or 411.

In some demonstrative embodiments, anchor node 402 may determine the presence of RRH 404 to communicate with anchor node 402 via mmWave fronthaul link 403.

In some demonstrative embodiments, anchor node 402 may determine the presence of RRH 408 to communicate with booster node 406 via mmWave fronthaul link 407. For example, anchor node 402 may determine the presence of RRH 408 based on the configuration data available to anchor node 402, data received via establishment of a communication protocol between anchor node 402 and booster node 406 via link 405, and/or data received via any other communication between anchor node 402 and booster node 406 and/or one or more other elements of system 400.

In some demonstrative embodiments, anchor node 402 may determine a capacity need for the fronthaul sub-resource block 208 (FIG. 2), for example, based on the number of RRH elements to be served, e.g., RRH 404 and RRH 408, as shown in FIG. 4.

In some demonstrative embodiments, anchor node 402 may assign mmWave resources to resource block 208 (FIG. 2), for example, based on the number of RRH elements to be served. In one example, anchor node 402 may assign mmWave resources to resource block 208 (FIG. 2) by multiplying the number of RRH elements to be served by a predefined amount of radio resources, e.g., which may be defined per fronthaul link.

In some demonstrative embodiments, anchor node 402 may determine that no mmWave radio resources are to be assigned to resource block 208 (FIG. 2), for example, if no RRHs are to be served. Accordingly, anchor node 402 may assign at least part of the resources of block 208 (FIG. 2) to one or more of blocks 204, 206 and 210 (FIG. 2).

In some demonstrative embodiments, anchor node 402 may determine air interface capabilities of booster node 406 for communicating over one or more access links. For example, anchor node 402 may determine whether booster node 406 may support only mmWave access link 409, whether booster node 406 may support only cellular access link 411, or whether booster node 406 may support both mmWave access link 409 and cellular access link 411.

For example, anchor node 402 may determine the air interface capabilities of booster node 406 based on the configuration data available to anchor node 402, data received via establishment of a communication protocol between anchor node 402 and booster node 406 via link 405, and/or data received via any other communication between anchor node 402 and booster node 406.

In some demonstrative embodiments, anchor node 402 may check, e.g., periodically, to determine an amount of delay sensitive traffic scheduled to booster node 406 via backhaul link 405 ("the delay sensitive needs of link 405").

In some demonstrative embodiments, anchor node 402 may establish a communication protocol to booster node 406, e.g., over backhaul link 405 or over any other communication interface between anchor node 402 and booster node 406.

In some demonstrative embodiments, booster node 406 may use the communication protocol to provide report information to anchor node 402, e.g., periodically. The report information may include, for example, information of the traffic needs over access links 409 and/or 411, the link quality of access links 409 and/or 411, a load over the air interface supported by access links 409 and/or 411, a capacity of access links 409 and/or 411, a usage of access links 409 and/or 411, and or any other information relating to access links 409 and/or 411.

In some demonstrative embodiments, anchor node 402 may determine and/or receive, e.g., periodically, link quality information relating to a quality of backhaul link 405, e.g., in terms of radio conditions ("the radio conditions of link 405"). The quality information may enable determining, for example, which one or more Modulation and Coding Schemes (MCS) may be used in scheduling of radio resources to link 405.

In some demonstrative embodiments, booster node 406 may send one or more notifications to anchor node 402, for example, based on an actual needed capacity for link 405. For example, booster node 406 may send one or more notifications to anchor node 402 to indicate that an actual capacity of link 405, resulting from an actual allocation of resources from block 204 (FIG. 2) to link 405, may be insufficient to serve actual capacity needs of links 409, 411 and/or 407.

In some demonstrative embodiments, anchor node 402 may allocate mmWave radio resources to access link 409 based on a load of cellular access link 411 between the node and UE 410, e.g., as described below.

In some demonstrative embodiments, anchor node 402 may allocate the same, or partially overlapping, mmWave radio resources to fronthaul links 403 and 407, for example, if spatial re-use of resources from resources 202 (FIG. 2) is possible, for example, due to network topology, e.g., as described below.

In some demonstrative embodiments, anchor node 402 may allocate the same, or partially overlapping, mmWave radio resources to fronthaul link 407 and access link 409, for example, if spatial re-use of resources from resources 202 (FIG. 2) on these different types of wireless communication links is possible, for example, due to network topology and/or node movement, e.g., as described below.

In some demonstrative embodiments, resource allocator 130 (FIG. 1) of anchor node 402 may offload traffic between mmWave access link 409 and cellular access link 411, based on an amount of available mmWave radio resources, e.g., as described below.

In some demonstrative embodiments, resource allocator 130 (FIG. 1) of anchor node 402 may allocate mmWave radio resources to access link 409 based on a number of UEs 410 in communication with booster node 406, e.g., as described below.

In some demonstrative embodiments, booster node 406 may indicate to anchor node 402, that booster node 406 is to utilize both mmWave access link 409 and cellular access link 411, e.g., as described above.

In some demonstrative embodiments, anchor node 402 may be notified by booster node 406 the backhaul capacity of backhaul link 405 is insufficient, e.g., as described above.

In some demonstrative embodiments, resource allocator 130 (FIG. 1) of anchor node 402 may allocate services from mmWave access link 409 to cellular access link 411, for example, as long as access link 411 may offer available capacity. The offload of traffic from mmWave access link 409 to cellular access link 411 may allow, for example, a reduction of the resource allocation of resource block 206 (FIG. 2) to access link 409. Accordingly, the additional available resources resulting from the reduction in the allocation of resource block 206 (FIG. 2) ("the freed resources") may be utilized for one or more other mmWave links. For example, resource allocator 130 (FIG. 1) may assign the freed resources to increase the resources of resource block 204 (FIG. 2).

In some demonstrative embodiments, offloading of services from mmWave link 409 to cellular link 411 may not be sufficient, for example, if access link 411 cannot provide a required capacity to offload the services from mmWave link 409.

In some demonstrative embodiments, resource allocator 130 (FIG. 1) of anchor node 402 may assign radio resources from another block of radio resources, for example, resource block 208 (FIG. 2) to resource block 206 (FIG. 2), and allocate the additional resources to access link 409.

In some demonstrative embodiments, there may not be enough radio resources in resource block 208 (FIG.) to support the required capacity for access link 409.

In some demonstrative embodiments, anchor node 402 may start to re-allocate services from mmWave access link 409 to be served directly by a macro cell controlled by anchor node 402, e.g., via a direct cellular access link from anchor node 402 to UE 410.

In some demonstrative embodiments, anchor node 402 may be notified by booster node 406 the backhaul capacity of backhaul link 405 is insufficient, booster node 406 is to utilize only mmWave access link 409, e.g., as described above. In some demonstrative embodiments, anchor node 402 may directly start to re-allocate services from mmWave access link 409 to be served by the macro node.

In some demonstrative embodiments, offloading traffic from mmWave access link 409 to a cellular radio interface of the macro cell (not shown in FIG. 4) may allow a reduction of the radio resources assigned to resource block 206 (FIG. 2). Accordingly, the freed resources may be utilized for one or more other mmWave links. For example, resource allocator 130 (FIG. 1) may assign the freed resources to increase the resources of resource block 204 (FIG. 2).

In some demonstrative embodiments, resource allocator 130 (FIG. 1) of anchor node 402 may identify that the mmWave resources allocated to backhaul link 405 may not be sufficient.

In one example, resource allocator 130 (FIG. 1) of anchor node 402 may identify that backhaul link 405 may become a bottle neck, for example, based on the radio conditions of backhaul link 405 and/or the delay sensitive service share of traffic to be communicated via backhaul link 405 ("the delay sensitive needs of link 405"), e.g., as described above.

In some demonstrative embodiments, resource allocator 130 (FIG. 1) of anchor node 402 may divide the radio resources of resource block 202 (FIG. 2) into two sub-groups of radio resources. For example, resource allocator 130 (FIG. 1) may allocate a first sub-group, denoted A1a, of the resources of resource block 204 (FIG. 2) to be used for delay sensitive services, and a second sub-group, denoted A1b, of the resources of resource block 204 (FIG. 2) to be used for best effort services. This assignment of the radio resources of resource block 204 (FIG. 2) may enable maintaining the amount of resources of resource block 204 (FIG. 2) substantially unchanged. Accordingly, this assignment of the radio resources of resource block 204 (FIG. 2) may have substantially no impact on the radio resources assigned to other resource blocks, e.g., resource blocks 206, 208 and/or 210 (FIG. 2).

In some demonstrative embodiments, resource allocator 130 (FIG. 1) may move radio resources between resources of the resource blocks A1*a* and A1*b*, for example, based on the radio conditions of link 405 and/or the delay sensitive needs of link 405.

In one example, resource allocator 130 (FIG. 1) may move radio resources from resource block A1*b* to resource block A1*a*, for example, by reducing the amount of resources assigned to resource block A1*b* and increasing the amount of resources assigned of block A1*a*.

For example, resource allocator 130 (FIG. 1) may move radio resources from resource block A1*b* to resource block A1*a*, if the amount of resources in block A1*b* is sufficient for supporting the delay sensitive needs of link 405 at the radio conditions of link 405.

In some demonstrative embodiments, the additional radio resources added to resource block A1*a* may be utilized to enhance backhaul communication.

In one example, the additional radio resources added to resource block A1*a* may be utilized by using lower MCS schemes over more resources, for example, to improve reliable reception within delay time constraints.

In another example, the additional radio resources added to resource block A1*a* may be utilized by enabling faster and more frequent HARQ re-transmissions, e.g., while maintaining the MCS schemes unchanged.

In some demonstrative embodiments, the radio resources of resource block 210 (FIG. 2) may be dynamically allocated, e.g., temporarily, between one or more of resource blocks 204, 206 and/or 208 (FIG. 2), for example, in addition to or instead of moving resources to between resource blocks 204, 206 and/or 208 (FIG. 2).

In some demonstrative embodiments, resource allocator 130 (FIG. 3) may dynamically assign resources of resource block 210 (FIG. 2) to one or more of mmWave links 405, 409, 407 and/or 403, for example, based on one or more of the criteria described above and/or any other criteria, e.g., as described below.

In some demonstrative embodiments, the resources of resource block 210 (FIG. 2) may be used to accommodate temporal increases in demand for radio resources, for example, over high gain beam connections, e.g., over links 403, 405 and/or 407. Additionally or alternatively, the resources of resource block 210 (FIG. 2) may be used to accommodate any other capacity need, e.g., as long as spatial separation may maintain a reduced level of interference between the links.

Figure 5:
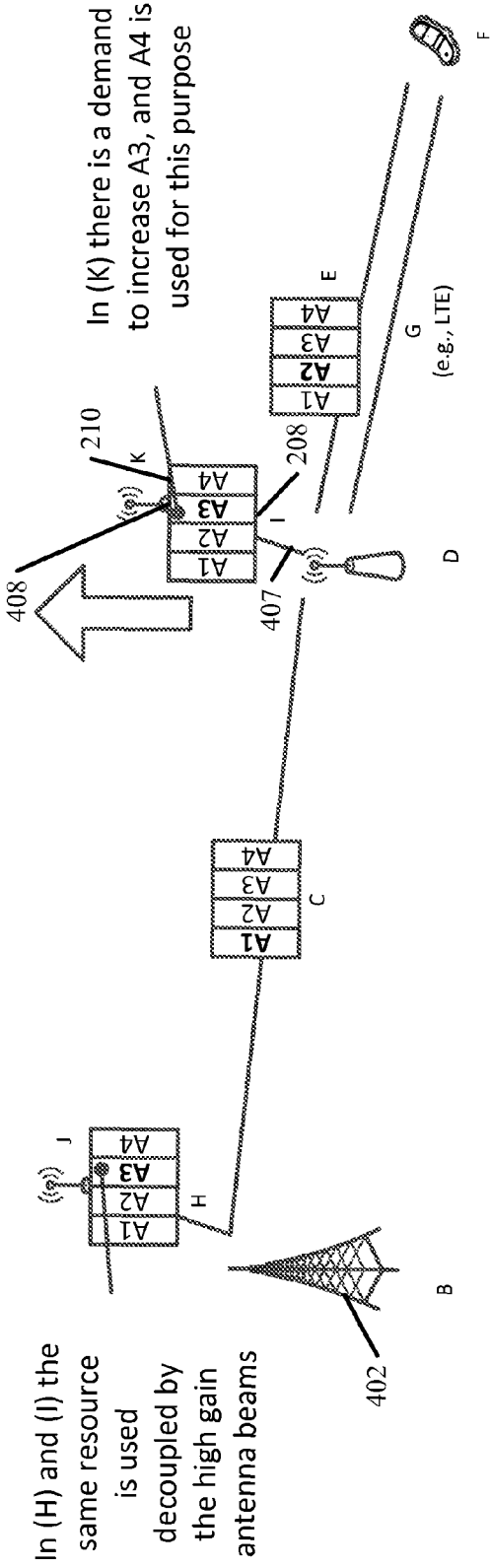
FIG. 5 is a schematic block diagram illustration of another allocation of radio resources in the deployment of FIG. 4, in accordance with some demonstrative embodiments.

FIG. 5 is a schematic block diagram illustration of another allocation of radio resources in the deployment of FIG. 4, in accordance with some demonstrative embodiments.

As shown in FIG. 5, resource allocator 130 (FIG. 1) of anchor node 402 may temporarily allocate to RRH 408 resources from resource block 210, for example, in addition to the resources allocated to fronthaul resource block 208, e.g., upon an increased demand of fronthaul resources for fronthaul link 407.

Figure 6:
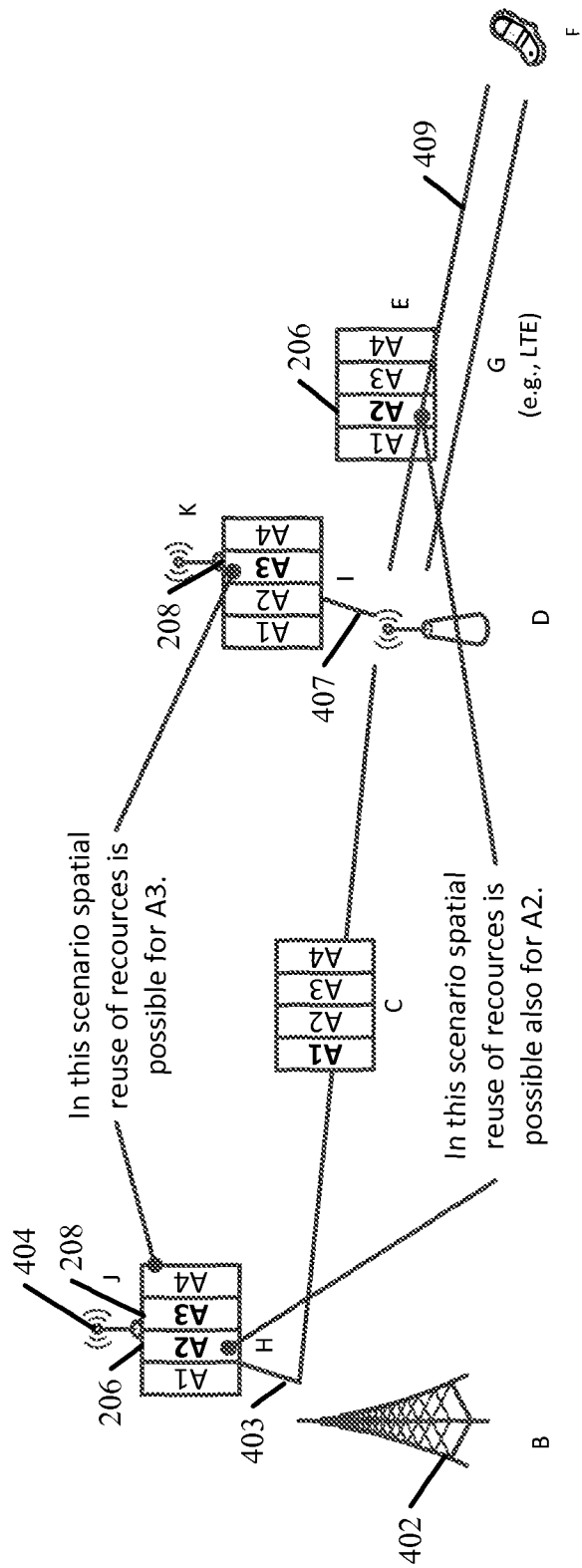
FIG. 6 is a schematic block diagram illustration of another allocation of radio resources in the deployment of FIG. 4, in accordance with some demonstrative embodiments.

FIG. 6 is a schematic block diagram illustration of another allocation of radio resources in the deployment of FIG. 4, in accordance with some demonstrative embodiments.

In some demonstrative embodiments, some radio resources of resources 202 (FIG. 2) may be reused based on spatial separation between one or more links.

In some demonstrative embodiments, radio resources, which are assigned to a first connection may be reused for a second connection, for example, if the first and second connections have a high level of spatial separation, for example, high gain beam connections.

In one example, as shown in FIG. 6, resource allocator 130 (FIG. 1) may allocate radio resources of block 208 to link 403, and resource allocator 130 (FIG. 1) may re-allocate to link 407 at least part of the resources of resource block 208, which were allocated to link 403, for example, if links 403 and 407 have a high level of spatial separation.

In another example, as shown in FIG. 6, resource allocator 130 (FIG. 1) may allocate to link 403 radio resources of block 206, which may include radio resources of resource block 206, which are allocated to access link 409, e.g., if links 403 and 409 have a high level of spatial separation.

In some demonstrative embodiments, RRH 404 may conduct periodic measurements e.g., on a sub-band of resource block 206. The re-use of radio resources of resource block 206 may be permitted, for example, if the measured signal strength sub-band of resource block 206 is less than a predefined threshold.

Figure 7:
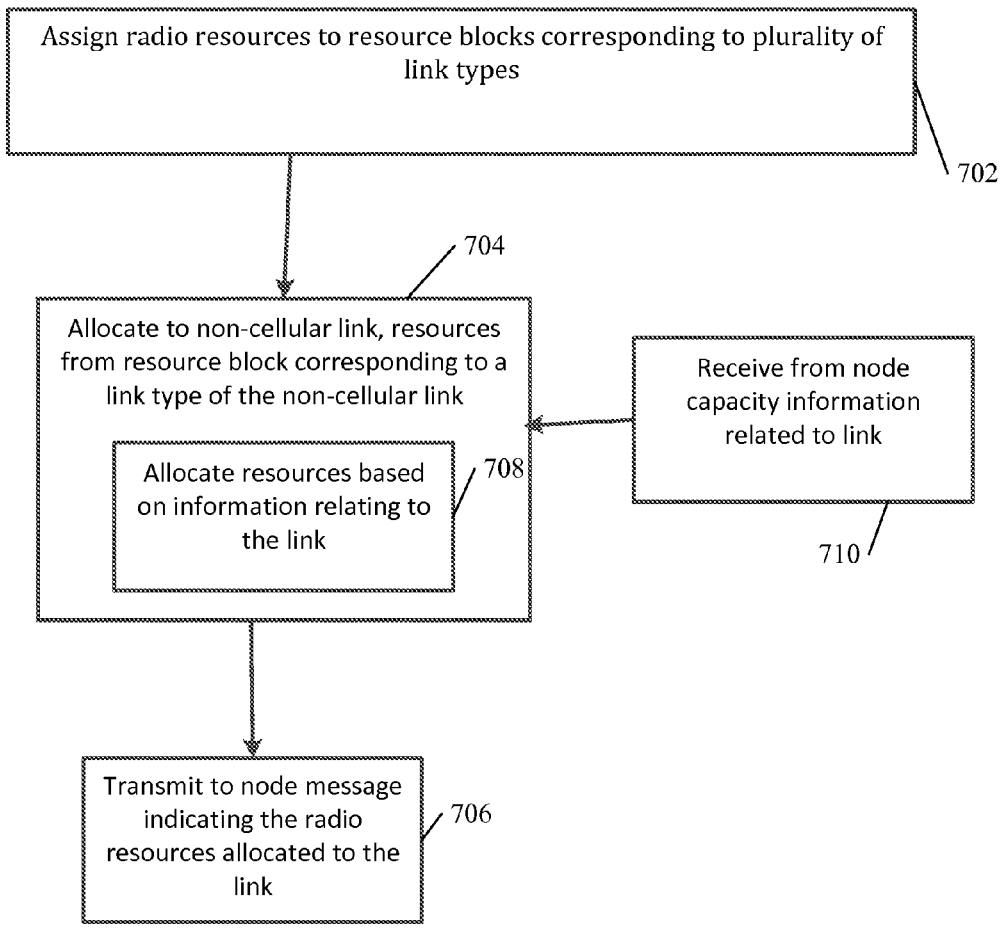
FIG. 7 is a schematic flow-chart illustration of a method of dynamic allocation of radio resources, in accordance with some demonstrative embodiments.

Reference is made to FIG. 7, which schematically illustrates a method of dynamic allocation of radio resources, in accordance with some demonstrative embodiments. For example, one or more operations of the method of FIG. 7 may be performed by a system, e.g., system 100 (FIG. 1), one or more elements of a core network, e.g., EPC 105 (FIG. 1), one or more elements of an infrastructure network, e.g., infrastructure network 102 (FIG. 1), a node, e.g., node 108 (FIG. 1), node 110 (FIG. 1), node 112 (FIG. 1), an RRH, e.g., RRH 114 (FIG. 1), and/or a resource allocator, e.g., resource allocator 130 (FIG. 1).

As indicated at block 702, the method may include assigning non-cellular radio resources to a plurality of resource blocks corresponding to a plurality of link types. For example, resource allocator 130 (FIG. 1) may allocate available resources 202 (FIG. 2) to resource blocks 204, 206, 208 and/or 210 (FIG. 2), e.g., as described above.

As indicated at block 704, the method may include dynamically allocating to a non-cellular wireless communication link resources from a resource block corresponding to a link type of the non-cellular wireless communication link. For example, resource allocator 130 (FIG. 1) may allocate radio resources from resource block 204 (FIG. 2) to mmWave backhaul links 116 and/or 118 (FIG. 1), resource allocator 130 (FIG. 1) may allocate radio resources from resource block 206 (FIG. 2) to mmWave access links 122 (FIG. 1), and/or resource allocator 130 (FIG. 1) may allocate radio resources from resource block 208 (FIG. 2) to fronthaul links 120 and/or 121 (FIG. 1), e.g., as described above.

As indicated at block 706, the method may include transmitting to a node at least one message indicating the radio resources allocated to non-cellular wireless communication link. For example, node 108 (FIG. 1) may transmit to node 110 (FIG. 1) a message including an indication of radio resources of resource block 204 (FIG. 2) allocated to backhaul link 116 (FIG. 1), radio resources of resource block 206 (FIG. 2) allocated to access link 122 (FIG. 1), and/or radio resources of resource block 208 (FIG. 2) allocated to fronthaul link 120 (FIG. 1), e.g., as described above.

As indicated at block 708, allocating the non-cellular radio resources may include allocating the non-cellular radio resources based on information relating to the non-cellular wireless communication link. For example, resource allocator 130 (FIG. 1) may allocate mmWave radio resources to backhaul link 116 (FIG. 1) based on information relating to radio conditions of backhaul link 116 (FIG. 1) and/or information relating to a needed capacity of backhaul link 116 (FIG. 1), e.g., as described above.

As indicated at block 710, the method may include receiving from the node capacity information indicating a needed capacity of the non-cellular wireless communication link. For example, node 108 (FIG. 1) may receive from node 110 (FIG. 1) information relating to a needed capacity of backhaul link 116 (FIG. 1), e.g., as described above.

Figure 8:
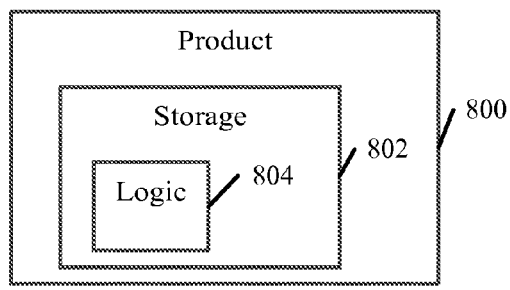
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of one or more elements of a system, e.g., system 100 (FIG. 1), one or more elements of a core network, e.g., EPC 105 (FIG. 1), one or more elements of an infrastructure network, e.g., infrastructure network 102 (FIG. 1), a node, e.g., node 108 (FIG. 1), node 110 (FIG. 1), node 112 (FIG. 1), an RRH, e.g., RRH 114 (FIG. 1), and/or a resource allocator, e.g., resource allocator 130 (FIG. 1), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of radio resource allocation, the apparatus comprising a resource allocator to dynamically allocate to a plurality of nodes of a cellular network non-cellular radio resources for communication over a plurality of non-cellular wireless communication links, the resource allocator is to assign the non-cellular radio resources to a plurality of resource blocks corresponding to a plurality of link types, and to dynamically allocate to a non-cellular wireless communication link resources from a resource block corresponding to a link type of the non-cellular wireless communication link.

Example 2 includes the subject matter of Example 1, and optionally, wherein the resource allocator is to allocate the non-cellular radio resources to the nodes based on at least one attribute of the plurality of non-cellular wireless communication links.

Example 3 includes the subject matter of Example 2, and optionally, wherein the at least one attribute comprises at least one attribute selected from the group consisting of a spatial arrangement of the non-cellular wireless communication links, a capacity of one or more of the non-cellular wireless communication links, an activity state of one or more of the non-cellular wireless communication links, a load of one or more of the non-cellular wireless communication links, a link quality of one or more of the non-cellular wireless communication links, detected interference between the non-cellular wireless communication links, and an anticipated interference between the non-cellular wireless communication links.

Example 4 includes the subject matter of any one of Examples 1-3, and optionally, wherein the resource allocator is to allocate the non-cellular radio resources to the plurality of nodes based on a topology of the plurality of nodes.

Example 5 includes the subject matter of any one of Examples 1-4, and optionally, wherein the resource blocks comprise a backhaul resource block, and wherein the resource allocator is to allocate non-cellular radio resources of the backhaul resource block to at least one non-cellular backhaul link between at least one pair of nodes.

Example 6 includes the subject matter of any one of Examples 1-5, and optionally, wherein the resource blocks comprise a fronthaul resource block, and wherein the resource allocator is to allocate non-cellular radio resources of the fronthaul resource block to at least one non-cellular fronthaul link between a node and at least one Remote Radio Head (RRH).

Example 7 includes the subject matter of any one of Examples 1-6, and optionally, wherein the resource blocks comprise an access resource block, and wherein the resource allocator is to allocate non-cellular radio resources of the access resource block to at least one non-cellular access link between a node and one or more User Equipment (UE).

Example 8 includes the subject matter of Example 7, and optionally, wherein the resource allocator is to allocate the non-cellular radio resources to the non-cellular access link based on a load of a cellular access link between the node and the one or more UEs.

Example 9 includes the subject matter of Example 7 or 8, and optionally, wherein the resource allocator is to offload traffic between the non-cellular access link and a cellular access link the node and the one or more UEs, based on an amount of available non-cellular radio resources.

Example 10 includes the subject matter of any one of Examples 7-9, and optionally, wherein the resource allocator is to allocate the non-cellular radio resources to the non-cellular access link based on a number of UEs in communication with the node.

Example 11 includes the subject matter of any one of Examples 1-10, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 12 includes the subject matter of any one of Examples 1-11, and optionally, wherein the plurality of nodes comprise infrastructure nodes of an infrastructure network between a cellular core network and a plurality of User Equipment (UE).

Example 13 includes the subject matter of any one of Examples 1-12, and optionally, wherein the plurality of nodes comprises nodes of a heterogeneous network (HetNet).

Example 14 includes the subject matter of any one of Examples 1-13, and optionally, wherein the non-cellular wireless communication links comprise Wireless Local Area Network (WLAN) links.

Example 15 includes the subject matter of any one of Examples 1-14, and optionally, wherein the non-cellular wireless communication links comprise millimeter wave (mmwave) links.

Example 16 includes the subject matter of any one of Examples 1-15, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 17 includes the subject matter of any one of Examples 1-16, and optionally, wherein the non-cellular radio resources comprise at least one resource selected from the group consisting of frequency domain resources, time domain resources, code resources and power resources.

Example 18 includes the subject matter of any one of Examples 1-17, and optionally, comprising a first node of the plurality of cellular nodes, the resource allocator to allocate the non-cellular resources to a second node of the plurality of cellular nodes.

Example 19 includes the subject matter of Example 18, and optionally, wherein the first node comprises an evolved Node B (eNB).

Example 20 includes the subject matter of Example 19, and optionally, wherein the eNB comprises an anchor eNB.

Example 21 includes the subject matter of any one of Examples 18-20, and optionally, wherein the second node comprises a node selected from the group consisting of a relay node, a booster eNB and a Remote Radio Head (RRH).

Example 22 includes an apparatus of radio resource allocation, the apparatus comprising a wireless communication transceiver to communicate with one or more devices of a cellular communication network over one or more non-cellular wireless communication links; and a controller to transmit to a node of the cellular network capacity information relating to a required capacity of the one or more non-cellular wireless communication links, and to receive from the node an allocation of non-cellular radio resources to be allocated to the one or more non-cellular wireless communication links according to a resource allocation scheme including a plurality of resource blocks corresponding to a plurality of link types, wherein a non-cellular wireless communication link is to be allocated with radio resources from a resource block corresponding to a link type of the non-cellular wireless communication link.

Example 23 includes the subject matter of Example 22, and optionally, wherein the resource blocks comprise a backhaul resource block, and wherein the one or more non-cellular wireless communication links comprise at least one non-cellular backhaul link between at least one pair of nodes.

Example 24 includes the subject matter of Example 22 or 23, and optionally, wherein the resource blocks comprise a fronthaul resource block, and wherein the one or more non-cellular wireless communication links comprise at least one non-cellular fronthaul link with at least one Remote Radio Head (RRH).

Example 25 includes the subject matter of any one of Examples 22-24, and optionally, wherein the resource blocks comprise an access resource block, and wherein the one or more non-cellular wireless communication links comprise at least one non-cellular access link with one or more User Equipment (UE).

Example 26 includes the subject matter of any one of Examples 22-25, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 27 includes the subject matter of any one of Examples 22-26, and optionally, comprising an infrastructure node of an infrastructure network between a cellular core network and a plurality of User Equipment (UE).

Example 28 includes the subject matter of any one of Examples 22-27, and optionally, comprising a node of a heterogeneous network (HetNet).

Example 29 includes the subject matter of any one of Examples 22-28, and optionally, wherein the non-cellular wireless communication links comprise Wireless Local Area Network (WLAN) links.

Example 30 includes the subject matter of any one of Examples 22-29, and optionally, wherein the non-cellular wireless communication links comprise millimeter wave (mmwave) links.

Example 31 includes the subject matter of any one of Examples 22-30, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 32 includes the subject matter of any one of Examples 22-31, and optionally, wherein the non-cellular radio resources comprise at least one resource selected from the group consisting of frequency domain resources, time domain resources, code resources and power resources.

Example 33 includes the subject matter of any one of Examples 22-32, and optionally, comprising an evolved Node B (eNB), a relay node or a booster node.

Example 34 includes a cellular communication system comprising an anchor node comprising a resource allocator to dynamically allocate to a plurality of nodes of the cellular communication system non-cellular radio resources for communication over a plurality of non-cellular wireless communication links, the resource allocator is to assign the non-cellular radio resources to a plurality of resource blocks corresponding to a plurality of link types, and to dynamically allocate to a non-cellular wireless communication link resources from a resource block corresponding to a link type of the non-cellular wireless communication link; and a transmitter to transmit to the nodes messages indicating the non-cellular radio resources allocated to the nodes.

Example 35 includes the subject matter of Example 34, and optionally, wherein the resource allocator is to allocate the non-cellular radio resources to the nodes based on at least one attribute of the plurality of non-cellular wireless communication links.

Example 36 includes the subject matter of Example 35, and optionally, wherein the at least one attribute comprises at least one attribute selected from the group consisting of a spatial arrangement of the non-cellular wireless communication links, a capacity of one or more of the non-cellular wireless communication links, an activity state of one or more of the non-cellular wireless communication links, a load of one or more of the non-cellular wireless communication links, a link quality of one or more of the non-cellular wireless communication links, detected interference between the non-cellular wireless communication links, and an anticipated interference between the non-cellular wireless communication links.

Example 37 includes the subject matter of any one of Examples 34-36, and optionally, wherein the resource allocator is to allocate the non-cellular radio resources to the plurality of nodes based on a topology of the plurality of nodes.

Example 38 includes the subject matter of any one of Examples 34-37, and optionally, wherein the resource blocks comprise a backhaul resource block, and wherein the resource allocator is to allocate non-cellular radio resources of the backhaul resource block to at least one non-cellular backhaul link between at least one pair of nodes.

Example 39 includes the subject matter of any one of Examples 34-38, and optionally, wherein the resource blocks comprise a fronthaul resource block, and wherein the resource allocator is to allocate non-cellular radio resources of the fronthaul resource block to at least one non-cellular fronthaul link between a node and at least one Remote Radio Head (RRH).

Example 40 includes the subject matter of any one of Examples 34-39, and optionally, wherein the resource blocks comprise an access resource block, and wherein the resource allocator is to allocate non-cellular radio resources of the access resource block to at least one non-cellular access link between a node and one or more User Equipment (UE).

Example 41 includes the subject matter of Example 40, and optionally, wherein the resource allocator is to allocate the non-cellular radio resources to the non-cellular access link based on a load of a cellular access link between the node and the one or more UEs.

Example 42 includes the subject matter of Example 40 or 41, and optionally, wherein the resource allocator is to offload traffic between the non-cellular access link and a cellular access link the node and the one or more UEs, based on an amount of available non-cellular radio resources.

Example 43 includes the subject matter of any one of Examples 40-42, and optionally, wherein the resource allocator is to allocate the non-cellular radio resources to the non-cellular access link based on a number of UEs in communication with the node.

Example 44 includes the subject matter of any one of Examples 34-43, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 45 includes the subject matter of any one of Examples 34-44, and optionally, wherein the plurality of nodes comprise infrastructure nodes of an infrastructure network between a cellular core network and a plurality of User Equipment (UE).

Example 46 includes the subject matter of any one of Examples 34-45, and optionally, wherein the plurality of nodes comprises nodes of a heterogeneous network (HetNet).

Example 47 includes the subject matter of any one of Examples 34-46, and optionally, wherein the non-cellular wireless communication links comprise Wireless Local Area Network (WLAN) links.

Example 48 includes the subject matter of any one of Examples 34-47, and optionally, wherein the non-cellular wireless communication links comprise millimeter wave (mmwave) links.

Example 49 includes the subject matter of any one of Examples 34-48, and optionally, wherein the cellular system comprises a Global System for Mobile (GSM) network, a Universal Mobile Telecommunications System (UMTS) network, a Long Term Evolution (LTE) network, an LTE-advanced network, or a Fifth Generation (5G) network.

Example 50 includes the subject matter of any one of Examples 34-49, and optionally, wherein the non-cellular radio resources comprise at least one resource selected from the group consisting of frequency domain resources, time domain resources, code resources and power resources.

Example 51 includes the subject matter of any one of Examples 34-50, and optionally, wherein the plurality of nodes comprise at least one node selected from the group consisting of a relay node, a booster eNB and a Remote Radio Head (RRH).

Example 52 includes a cellular communication system comprising a small cell node comprising one or more antennas; a wireless communication transceiver to communicate with one or more devices of a cellular network over one or more non-cellular wireless communication links; and a controller to transmit to a macro cell node of the cellular network capacity information relating to a required capacity of the one or more non-cellular wireless communication links, and to receive from the macro cell node an allocation of non-cellular radio resources to be allocated to the one or more non-cellular wireless communication links according to a resource allocation scheme including a plurality of resource blocks corresponding to a plurality of link types, wherein a non-cellular wireless communication link is to be allocated with radio resources from a resource block corresponding to a link type of the non-cellular wireless communication link.

Example 53 includes the subject matter of Example 52, and optionally, wherein the resource blocks comprise a backhaul resource block, and wherein the one or more non-cellular wireless communication links comprise at least one non-cellular backhaul link between at least one pair of nodes.

Example 54 includes the subject matter of Example 52 or 53, and optionally, wherein the resource blocks comprise a fronthaul resource block, and wherein the one or more non-cellular wireless communication links comprise at least one non-cellular fronthaul link with at least one Remote Radio Head (RRH).

Example 55 includes the subject matter of any one of Examples 52-54, and optionally, wherein the resource blocks comprise an access resource block, and wherein the one or more non-cellular wireless communication links comprise at least one non-cellular access link with one or more User Equipment (UE).

Example 56 includes the subject matter of any one of Examples 52-55, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 57 includes the subject matter of any one of Examples 52-56, and optionally, wherein the small cell node comprises an infrastructure node of an infrastructure network between a cellular core network and a plurality of User Equipment (UE).

Example 58 includes the subject matter of any one of Examples 52-57, and optionally, wherein the small cell node comprises a node of a heterogeneous network (HetNet).

Example 59 includes the subject matter of any one of Examples 52-58, and optionally, wherein the non-cellular wireless communication links comprise Wireless Local Area Network (WLAN) links.

Example 60 includes the subject matter of any one of Examples 52-59, and optionally, wherein the non-cellular wireless communication links comprise millimeter wave (mmwave) links.

Example 61 includes the subject matter of any one of Examples 52-60, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 62 includes the subject matter of any one of Examples 52-61, and optionally, wherein the non-cellular radio resources comprise at least one resource selected from the group consisting of frequency domain resources, time domain resources, code resources and power resources.

Example 63 includes the subject matter of any one of Examples 52-62, and optionally, wherein the small cell node comprises an evolved Node B (eNB), a relay node or a booster node.

Example 64 includes a method of radio resource allocation, the method comprising assigning non-cellular radio resources to a plurality of resource blocks corresponding to a plurality of link types; and allocating the non-cellular radio resources to a plurality of nodes of a cellular network for communication over a plurality of non-cellular wireless communication links, the allocating comprises dynamically allocating to a non-cellular wireless communication link resources from a resource block corresponding to a link type of the non-cellular wireless communication link.

Example 65 includes the subject matter of Example 64, and optionally, comprising allocating the non-cellular radio resources to the nodes based on at least one attribute of the plurality of non-cellular wireless communication links.

Example 66 includes the subject matter of Example 65, and optionally, wherein the at least one attribute comprises at least one attribute selected from the group consisting of a spatial arrangement of the non-cellular wireless communication links, a capacity of one or more of the non-cellular wireless communication links, an activity state of one or more of the non-cellular wireless communication links, a load of one or more of the non-cellular wireless communication links, a link quality of one or more of the non-cellular wireless communication links, detected interference between the non-cellular wireless communication links, and an anticipated interference between the non-cellular wireless communication links.

Example 67 includes the subject matter of any one of Examples 64-66, and optionally, comprising allocating the non-cellular radio resources to the plurality of nodes based on a topology of the plurality of nodes.

Example 68 includes the subject matter of any one of Examples 64-67, and optionally, wherein the resource blocks comprise a backhaul resource block, and wherein the allocating comprises allocating non-cellular radio resources of the backhaul resource block to at least one non-cellular backhaul link between at least one pair of nodes.

Example 69 includes the subject matter of any one of Examples 64-68, and optionally, wherein the resource blocks comprise a fronthaul resource block, and wherein the allocating comprises allocating non-cellular radio resources of the fronthaul resource block to at least one non-cellular fronthaul link between a node and at least one Remote Radio Head (RRH).

Example 70 includes the subject matter of any one of Examples 64-69, and optionally, wherein the resource blocks comprise an access resource block, and wherein the allocating comprises allocating non-cellular radio resources of the access resource block to at least one non-cellular access link between a node and one or more User Equipment (UE).

Example 71 includes the subject matter of Example 70, and optionally, comprising allocating the non-cellular radio resources to the non-cellular access link based on a load of a cellular access link between the node and the one or more UEs.

Example 72 includes the subject matter of Example 70 or 71, and optionally, comprising offloading traffic between the non-cellular access link and a cellular access link the node and the one or more UEs, based on an amount of available non-cellular radio resources.

Example 73 includes the subject matter of any one of Examples 70-72, and optionally, comprising allocating the non-cellular radio resources to the non-cellular access link based on a number of UEs in communication with the node.

Example 74 includes the subject matter of any one of Examples 64-73, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 75 includes the subject matter of any one of Examples 64-74, and optionally, wherein the plurality of nodes comprise infrastructure nodes of an infrastructure network between a cellular core network and a plurality of User Equipment (UE).

Example 76 includes the subject matter of any one of Examples 64-75, and optionally, wherein the plurality of nodes comprises nodes of a heterogeneous network (HetNet).

Example 77 includes the subject matter of any one of Examples 64-76, and optionally, wherein the non-cellular wireless communication links comprise Wireless Local Area Network (WLAN) links.

Example 78 includes the subject matter of any one of Examples 64-77, and optionally, wherein the non-cellular wireless communication links comprise millimeter wave (mmwave) links.

Example 79 includes the subject matter of any one of Examples 64-78, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 80 includes the subject matter of any one of Examples 64-79, and optionally, wherein the non-cellular radio resources comprise at least one resource selected from the group consisting of frequency domain resources, time domain resources, code resources and power resources.

Example 81 includes a method of radio resource allocation, the method comprising communicating with one or more devices of a cellular communication network over one or more non-cellular wireless communication links; transmitting to a node of the cellular network capacity information relating to a required capacity of the one or more non-cellular wireless communication links; and receiving from the node an allocation of non-cellular radio resources to be allocated to the one or more non-cellular wireless communication links according to a resource allocation scheme including a plurality of resource blocks corresponding to a plurality of link types, wherein a non-cellular wireless communication link is to be allocated with radio resources from a resource block corresponding to a link type of the non-cellular wireless communication link.

Example 82 includes the subject matter of Example 81, and optionally, wherein the resource blocks comprise a backhaul resource block, and wherein the one or more non-cellular wireless communication links comprise at least one non-cellular backhaul link between at least one pair of nodes.

Example 83 includes the subject matter of Example 81 or 82, and optionally, wherein the resource blocks comprise a fronthaul resource block, and wherein the one or more non-cellular wireless communication links comprise at least one non-cellular fronthaul link with at least one Remote Radio Head (RRH).

Example 84 includes the subject matter of any one of Examples 81-83, and optionally, wherein the resource blocks comprise an access resource block, and wherein the one or more non-cellular wireless communication links comprise at least one non-cellular access link with one or more User Equipment (UE).

Example 85 includes the subject matter of any one of Examples 81-84, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 86 includes the subject matter of any one of Examples 81-85, and optionally, wherein the non-cellular wireless communication links comprise Wireless Local Area Network (WLAN) links.

Example 87 includes the subject matter of any one of Examples 81-86, and optionally, wherein the non-cellular wireless communication links comprise millimeter wave (mmwave) links.

Example 88 includes the subject matter of any one of Examples 81-87, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 89 includes the subject matter of any one of Examples 81-88, and optionally, wherein the non-cellular radio resources comprise at least one resource selected from the group consisting of frequency domain resources, time domain resources, code resources and power resources.

Example 90 includes a product including a non-transitory storage medium having stored thereon instructions that, when executed by a machine, result in assigning non-cellular radio resources to a plurality of resource blocks corresponding to a plurality of link types; and allocating the non-cellular radio resources to a plurality of nodes of a cellular network for communication over a plurality of non-cellular wireless communication links, the allocating comprises dynamically allocating to a non-cellular wireless communication link resources from a resource block corresponding to a link type of the non-cellular wireless communication link.

Example 91 includes the subject matter of Example 90, and optionally, wherein the instructions result in allocating the non-cellular radio resources to the nodes based on at least one attribute of the plurality of non-cellular wireless communication links.

Example 92 includes the subject matter of Example 91, and optionally, wherein the at least one attribute comprises at least one attribute selected from the group consisting of a spatial arrangement of the non-cellular wireless communication links, a capacity of one or more of the non-cellular wireless communication links, an activity state of one or more of the non-cellular wireless communication links, a load of one or more of the non-cellular wireless communication links, a link quality of one or more of the non-cellular wireless communication links, detected interference between the non-cellular wireless communication links, and an anticipated interference between the non-cellular wireless communication links.

Example 93 includes the subject matter of any one of Examples 90-92, and optionally, wherein the instructions result in allocating the non-cellular radio resources to the plurality of nodes based on a topology of the plurality of nodes.

Example 94 includes the subject matter of any one of Examples 90-93, and optionally, wherein the resource blocks comprise a backhaul resource block, and wherein the allocating comprises allocating non-cellular radio resources of the backhaul resource block to at least one non-cellular backhaul link between at least one pair of nodes.

Example 95 includes the subject matter of any one of Examples 90-94, and optionally, wherein the resource blocks comprise a fronthaul resource block, and wherein the allocating comprises allocating non-cellular radio resources of the fronthaul resource block to at least one non-cellular fronthaul link between a node and at least one Remote Radio Head (RRH).

Example 96 includes the subject matter of any one of Examples 90-95, and optionally, wherein the resource blocks comprise an access resource block, and wherein the allocating comprises allocating non-cellular radio resources of the access resource block to at least one non-cellular access link between a node and one or more User Equipment (UE).

Example 97 includes the subject matter of Example 96, and optionally, wherein the instructions result in allocating the non-cellular radio resources to the non-cellular access link based on a load of a cellular access link between the node and the one or more UEs.

Example 98 includes the subject matter of Example 96 or 97, and optionally, wherein the instructions result in offloading traffic between the non-cellular access link and a cellular access link the node and the one or more UEs, based on an amount of available non-cellular radio resources.

Example 99 includes the subject matter of any one of Examples 96-98, and optionally, wherein the instructions result in allocating the non-cellular radio resources to the non-cellular access link based on a number of UEs in communication with the node.

Example 100 includes the subject matter of any one of Examples 90-99, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 101 includes the subject matter of any one of Examples 90-100, and optionally, wherein the plurality of nodes comprise infrastructure nodes of an infrastructure network between a cellular core network and a plurality of User Equipment (UE).

Example 102 includes the subject matter of any one of Examples 90-101, and optionally, wherein the plurality of nodes comprises nodes of a heterogeneous network (HetNet).

Example 103 includes the subject matter of any one of Examples 90-102, and optionally, wherein the non-cellular wireless communication links comprise Wireless Local Area Network (WLAN) links.

Example 104 includes the subject matter of any one of Examples 90-103, and optionally, wherein the non-cellular wireless communication links comprise millimeter wave (mmwave) links.

Example 105 includes the subject matter of any one of Examples 90-104, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 106 includes the subject matter of any one of Examples 90-105, and optionally, wherein the non-cellular radio resources comprise at least one resource selected from the group consisting of frequency domain resources, time domain resources, code resources and power resources.

Example 107 includes a product including a non-transitory storage medium having stored thereon instructions that, when executed by a machine, result in communicating with one or more devices of a cellular communication network over one or more non-cellular wireless communication links; transmitting to a node of the cellular network capacity information relating to a required capacity of the one or more non-cellular wireless communication links; and receiving from the node an allocation of non-cellular radio resources to be allocated to the one or more non-cellular wireless communication links according to a resource allocation scheme including a plurality of resource blocks corresponding to a plurality of link types, wherein a non-cellular wireless communication link is to be allocated with radio resources from a resource block corresponding to a link type of the non-cellular wireless communication link.

Example 108 includes the subject matter of Example 107, and optionally, wherein the resource blocks comprise a backhaul resource block, and wherein the one or more non-cellular wireless communication links comprise at least one non-cellular backhaul link between at least one pair of nodes.

Example 109 includes the subject matter of Example 107 or 108, and optionally, wherein the resource blocks comprise a fronthaul resource block, and wherein the one or more non-cellular wireless communication links comprise at least one non-cellular fronthaul link with at least one Remote Radio Head (RRH).

Example 110 includes the subject matter of any one of Examples 107-109, and optionally, wherein the resource blocks comprise an access resource block, and wherein the one or more non-cellular wireless communication links comprise at least one non-cellular access link with one or more User Equipment (UE).

Example 111 includes the subject matter of any one of Examples 107-110, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 112 includes the subject matter of any one of Examples 107-111, and optionally, wherein the non-cellular wireless communication links comprise Wireless Local Area Network (WLAN) links.

Example 113 includes the subject matter of any one of Examples 107-112, and optionally, wherein the non-cellular wireless communication links comprise millimeter wave (mmwave) links.

Example 114 includes the subject matter of any one of Examples 107-113, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 115 includes the subject matter of any one of Examples 107-114, and optionally, wherein the non-cellular radio resources comprise at least one resource selected from the group consisting of frequency domain resources, time domain resources, code resources and power resources.

Example 116 includes an apparatus of radio resource allocation, the apparatus comprising means for assigning non-cellular radio resources to a plurality of resource blocks corresponding to a plurality of link types; and means for allocating the non-cellular radio resources to a plurality of nodes of a cellular network for communication over a plurality of non-cellular wireless communication links, the allocating comprises dynamically allocating to a non-cellular wireless communication link resources from a resource block corresponding to a link type of the non-cellular wireless communication link.

Example 117 includes the subject matter of Example 116, and optionally, comprising means for allocating the non-cellular radio resources to the nodes based on at least one attribute of the plurality of non-cellular wireless communication links.

Example 118 includes the subject matter of Example 117, and optionally, wherein the at least one attribute comprises at least one attribute selected from the group consisting of a spatial arrangement of the non-cellular wireless communication links, a capacity of one or more of the non-cellular wireless communication links, an activity state of one or more of the non-cellular wireless communication links, a load of one or more of the non-cellular wireless communication links, a link quality of one or more of the non-cellular wireless communication links, detected interference between the non-cellular wireless communication links, and an anticipated interference between the non-cellular wireless communication links.

Example 119 includes the subject matter of any one of Examples 116-118, and optionally, comprising means for allocating the non-cellular radio resources to the plurality of nodes based on a topology of the plurality of nodes.

Example 120 includes the subject matter of any one of Examples 116-119, and optionally, wherein the resource blocks comprise a backhaul resource block, and wherein the allocating comprises allocating non-cellular radio resources of the backhaul resource block to at least one non-cellular backhaul link between at least one pair of nodes.

Example 121 includes the subject matter of any one of Examples 116-120, and optionally, wherein the resource blocks comprise a fronthaul resource block, and wherein the allocating comprises allocating non-cellular radio resources of the fronthaul resource block to at least one non-cellular fronthaul link between a node and at least one Remote Radio Head (RRH).

Example 122 includes the subject matter of any one of Examples 116-121, and optionally, wherein the resource blocks comprise an access resource block, and wherein the allocating comprises allocating non-cellular radio resources of the access resource block to at least one non-cellular access link between a node and one or more User Equipment (UE).

Example 123 includes the subject matter of Example 122, and optionally, comprising means for allocating the non-cellular radio resources to the non-cellular access link based on a load of a cellular access link between the node and the one or more UEs.

Example 124 includes the subject matter of Example 122 or 123, and optionally, comprising means for offloading traffic between the non-cellular access link and a cellular access link the node and the one or more UEs, based on an amount of available non-cellular radio resources.

Example 125 includes the subject matter of any one of Examples 122-124, and optionally, comprising means for allocating the non-cellular radio resources to the non-cellular access link based on a number of UEs in communication with the node.

Example 126 includes the subject matter of any one of Examples 116-125, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 127 includes the subject matter of any one of Examples 116-126, and optionally, wherein the plurality of nodes comprise infrastructure nodes of an infrastructure network between a cellular core network and a plurality of User Equipment (UE).

Example 128 includes the subject matter of any one of Examples 116-127, and optionally, wherein the plurality of nodes comprises nodes of a heterogeneous network (HetNet).

Example 129 includes the subject matter of any one of Examples 116-128, and optionally, wherein the non-cellular wireless communication links comprise Wireless Local Area Network (WLAN) links.

Example 130 includes the subject matter of any one of Examples 116-129, and optionally, wherein the non-cellular wireless communication links comprise millimeter wave (mmwave) links.

Example 131 includes the subject matter of any one of Examples 116-130, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 132 includes the subject matter of any one of Examples 116-131, and optionally, wherein the non-cellular radio resources comprise at least one resource selected from the group consisting of frequency domain resources, time domain resources, code resources and power resources.

Example 133 includes an apparatus of radio resource allocation, the apparatus comprising means for communicating with one or more devices of a cellular communication network over one or more non-cellular wireless communication links; means for transmitting to a node of the cellular network capacity information relating to a required capacity of the one or more non-cellular wireless communication links; and means for receiving from the node an allocation of non-cellular radio resources to be allocated to the one or more non-cellular wireless communication links according to a resource allocation scheme including a plurality of resource blocks corresponding to a plurality of link types, wherein a non-cellular wireless communication link is to be allocated with radio resources from a resource block corresponding to a link type of the non-cellular wireless communication link.

Example 134 includes the subject matter of Example 133, and optionally, wherein the resource blocks comprise a backhaul resource block, and wherein the one or more non-cellular wireless communication links comprise at least one non-cellular backhaul link between at least one pair of nodes.

Example 135 includes the subject matter of Example 133 or 134, and optionally, wherein the resource blocks comprise a fronthaul resource block, and wherein the one or more non-cellular wireless communication links comprise at least one non-cellular fronthaul link with at least one Remote Radio Head (RRH).

Example 136 includes the subject matter of any one of Examples 133-135, and optionally, wherein the resource blocks comprise an access resource block, and wherein the one or more non-cellular wireless communication links comprise at least one non-cellular access link with one or more User Equipment (UE).

Example 137 includes the subject matter of any one of Examples 133-136, and optionally, wherein the plurality of resource blocks include a backhaul resource block, a fronthaul resource block, an access resource block, and an open resource block, the backhaul resource block including non-cellular radio resources to be allocated to non-cellular wireless communication backhaul links, the fronthaul resource block including non-cellular radio resources to be allocated to non-cellular wireless communication fronthaul links, the access resource block including non-cellular radio resources to be allocated to non-cellular wireless communication access links, and the open resource block including non-cellular radio resources.

Example 138 includes the subject matter of any one of Examples 133-137, and optionally, wherein the non-cellular wireless communication links comprise Wireless Local Area Network (WLAN) links.

Example 139 includes the subject matter of any one of Examples 133-138, and optionally, wherein the non-cellular wireless communication links comprise millimeter wave (mmwave) links.

Example 140 includes the subject matter of any one of Examples 133-139, and optionally, wherein the cellular network comprises a Global System for Mobile (GSM) network, a Universal Mobile Telecommunications System (UMTS) network, a Long Term Evolution (LTE) network, an LTE-advanced network, or a Fifth Generation (5G) network.

Example 141 includes the subject matter of any one of Examples 133-140, and optionally, wherein the non-cellular radio resources comprise at least one resource selected from the group consisting of frequency domain resources, time domain resources, code resources and power resources.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a resource allocator to dynamically allocate to a plurality of nodes of a cellular network millimeter Wave (mmWave) radio resources for communication over a plurality of mmWave wireless communication links of a plurality of mmWave link types, the plurality of mmWave link types comprising at least two of an mmWave backhaul link type, an mmWave fronthaul link type or an mmWave access link type, said resource allocator is to assign said mmWave radio resources to a plurality of mmWave resource blocks corresponding to the plurality of mmWave link types, and to dynamically allocate to an mmWave wireless communication link resources from an mmWave resource block corresponding to an mmWave link type of said mmWave wireless communication link.

2. The apparatus of claim 1, wherein said resource allocator is to allocate said mmWave radio resources to said nodes based on at least one attribute of said plurality of mmWave wireless communication links.

3. The apparatus of claim 2, wherein said at least one attribute comprises at least one attribute selected from the group consisting of a spatial arrangement of said mmWave wireless communication links, a capacity of one or more of said mmWave wireless communication links, an activity state of one or more of said mmWave wireless communication links, a load of one or more of said mmWave wireless communication links, a link quality of one or more of said mmWave wireless communication links, detected interference between said mmWave wireless communication links, and an anticipated interference between said mmWave wireless communication links.

4. The apparatus of claim 1, wherein said resource allocator is to allocate the mmWave radio resources to the plurality of nodes based on a topology of said plurality of nodes.

5. The apparatus of claim 1, wherein said mmWave resource blocks comprise an mmWave backhaul resource block, and wherein said resource allocator is to allocate mmWave radio resources of said mmWave backhaul resource block to at least one mmWave backhaul link between at least one pair of nodes.

6. The apparatus of claim 1 wherein said mmWave resource blocks comprise an mmWave fronthaul resource block, and wherein said resource allocator is to allocate mmWave radio resources of said mmWave fronthaul resource block to at least one mmWave fronthaul link between a node and at least one Remote Radio Head (RRH).

7. The apparatus of claim 1, wherein said mmWave resource blocks comprise an mmWave access resource block, and wherein said resource allocator is to allocate mmWave radio resources of said mmWave access resource block to at least one mmWave access link between a node and one or more User Equipment (UEs).

8. The apparatus of claim 7, wherein said resource allocator is to allocate said mmWave radio resources to said mmWave access link based on a load of a cellular access link between the node and the one or more UEs.

9. The apparatus of claim 7, wherein said resource allocator is to offload traffic between said mmWave access link and a cellular access link between the node and the one or more UEs, based on an amount of available mmWave radio resources.

10. The apparatus of claim 7, wherein said resource allocator is to allocate said mmWave radio resources to said mmWave access link based on a number of UEs in communication with said node.

11. The apparatus of claim 1, wherein said plurality of mmWave resource blocks include a backhaul resource block, a fronthaul resource block, an access resource block, and an open resource block, the backhaul resource block including mmWave radio resources to be allocated to mmWave wireless communication backhaul links, the fronthaul resource block including mmWave radio resources to be allocated to mmWave wireless communication fronthaul links, the access resource block including mmWave radio resources to be allocated to mmWave wireless communication access links, and the open resource block including mmWave radio resources.

12. An apparatus comprising:
a wireless communication transceiver to communicate with one or more devices of a cellular communication network over one or more millimeter Wave (mmWave) wireless communication links; and
a controller to transmit to a node of said cellular communication network capacity information relating to a required capacity of said one or more mmWave wireless communication links, and to receive from said node an allocation of mmWave radio resources to be allocated to said one or more mmWave wireless communication links according to a resource allocation scheme including a plurality of mmWave resource blocks corresponding to a plurality of mmWave link types, the plurality of mmWave link types comprising at least two of an mmWave backhaul link type, an mmWave fronthaul link type or an mmWave access link type, wherein an mmWave wireless communication link is to be allocated with mmWave radio resources from an mmWave resource block corresponding to an mmWave link type of said mmWave wireless communication link.

13. The apparatus of claim 1, wherein said cellular network comprises a Global System for Mobile (GSM) network, a Universal Mobile Telecommunications System (UMTS) network, a Long Term Evolution (LTE) network, an LTE-advanced network, or a Fifth Generation (5G) network.

14. The apparatus of claim 1, wherein said mmWave radio resources comprise at least one resource selected from the group consisting of frequency domain resources, time domain resources, code resources and power resources.

15. The apparatus of claim 1 comprising a first node of the plurality of cellular nodes, said resource allocator to allocate said mmWave resources to a second node of said plurality of cellular nodes.

16. The apparatus of claim 15, wherein said first node comprises an anchor evolved node B (eNB).

17. The apparatus of claim 12, wherein said node comprises an anchor evolved node B (eNB).

18. The apparatus of claim 12, wherein said plurality of mmWave resource blocks include a backhaul resource block, a fronthaul resource block, an access resource block, and an open resource block, the backhaul resource block including mmWave radio resources to be allocated to mmWave wireless communication backhaul links, the fronthaul resource block including mmWave radio resources to be allocated to mmWave wireless communication fronthaul links, the access resource block including mmWave radio resources to be allocated to mmWave wireless communication access links, and the open resource block including mmWave radio resources.

19. The apparatus of claim 12 comprising an evolved Node B (eNB), a relay node or a booster node.

20. A product including a non-transitory storage medium having stored thereon instructions that, when executed by a machine, result in:
assigning millimeter Wave (mmWave) radio resources to a plurality of mmWave resource blocks corresponding to a plurality of mmWave link types, the plurality of mmWave link types comprising at least two of an mmWave backhaul link type, an mmWave fronthaul link type or an mmWave access link type; and
allocating said mmWave radio resources to a plurality of nodes of a cellular network for communication over a plurality of mmWave wireless communication links of the plurality of mmWave link types, said allocating comprises dynamically allocating to an mmWave wireless communication link mmWave resources from an mmWave resource block corresponding to an mmWave link type of said mmWave wireless communication link.

21. The product of claim 20, wherein said instructions result in allocating said mmWave radio resources to said nodes based on at least one attribute of said plurality of mmWave wireless communication links.

22. The product of claim 20, wherein said plurality of mmWave resource blocks include a backhaul resource block, a fronthaul resource block, an access resource block, and an open resource block, the backhaul resource block including mmWave radio resources to be allocated to mmWave wireless communication backhaul links, the fronthaul resource block including mmWave radio resources to be allocated to mmWave wireless communication fronthaul links, the access resource block including mmWave radio resources to be allocated to mmWave wireless communication access links, and the open resource block including mmWave radio resources.

23. A product including a non-transitory storage medium having stored thereon instructions that, when executed by a machine, result in:
communicating with one or more devices of a cellular communication network over one or more millimeter Wave (mmWave) wireless communication links;
transmitting to a node of said cellular communication network capacity information relating to a required capacity of said one or more mmWave wireless communication links; and
receiving from said node an allocation of mmWave radio resources to be allocated to said one or more mmWave wireless communication links according to a resource allocation scheme including a plurality of mmWave resource blocks corresponding to a plurality of mmWave link types, the plurality of mmWave link types comprising at least two of an mmWave backhaul link type, an mmWave fronthaul link type or an mmWave access link type, wherein an mmWave wireless communication link is to be allocated with mmWave radio resources from an mmWave resource block corresponding to an mmWave link type of said mmWave wireless communication link.

24. The product of claim 23, wherein said plurality of mmWave resource blocks include a backhaul resource block, a fronthaul resource block, an access resource block, and an open resource block, the backhaul resource block including mmWave radio resources to be allocated to mmWave wireless communication backhaul links, the fronthaul resource block including mmWave radio resources to be allocated to mmWave wireless communication fronthaul links, the access resource block including mmWave radio resources to be allocated to mmWave wireless communication access links, and the open resource block including mmWave radio resources.

* * * * *